(12) United States Patent
Bloomstein et al.

(10) Patent No.: US 7,392,421 B1
(45) Date of Patent: Jun. 24, 2008

(54) FRAMEWORK FOR MANAGING CLUSTERING AND REPLICATION

(75) Inventors: Jason R. Bloomstein, Palo Alto, CA (US); Milind M. Barve, Maharashtra (IN)

(73) Assignee: Symantec Operating Corporation, Cupertino, CA (US)

( * ) Notice: Subject to any disclaimer, the term of this patent is extended or adjusted under 35 U.S.C. 154(b) by 529 days.

(21) Appl. No.: 10/100,386

(22) Filed: Mar. 18, 2002

(51) Int. Cl.
G06F 11/00 (2006.01)
(52) U.S. Cl. .................................. 714/4; 714/6
(58) Field of Classification Search .................. 714/15, 714/4, 6; 709/223
See application file for complete search history.

(56) References Cited

U.S. PATENT DOCUMENTS

| | | | | |
|---|---|---|---|---|
| 5,812,748 | A * | 9/1998 | Ohran et al. | 714/4 |
| 6,088,727 | A * | 7/2000 | Hosokawa et al. | 709/223 |
| 6,185,695 | B1 * | 2/2001 | Murphy et al. | 714/4 |
| 6,266,781 | B1 * | 7/2001 | Chung et al. | 714/4 |
| 6,438,705 | B1 * | 8/2002 | Chao et al. | 714/4 |
| 6,502,205 | B1 * | 12/2002 | Yanai et al. | 714/7 |
| 6,598,077 | B2 * | 7/2003 | Primak et al. | 709/219 |
| 6,772,304 | B2 * | 8/2004 | Hino et al. | 711/162 |
| 6,938,084 | B2 * | 8/2005 | Gamache et al. | 709/226 |
| 7,035,922 | B2 * | 4/2006 | Parham | 709/224 |
| 2001/0044879 | A1 * | 11/2001 | Moulton et al. | 711/114 |
| 2002/0099916 | A1 * | 7/2002 | Ohran et al. | 711/162 |
| 2003/0200473 | A1 * | 10/2003 | Fung | 713/320 |
| 2004/0049573 | A1 * | 3/2004 | Olmstead et al. | 709/224 |
| 2005/0165861 | A1 * | 7/2005 | Christie et al. | 707/201 |
| 2006/0259609 | A1 * | 11/2006 | Hunt et al. | 709/223 |
| 2007/0088972 | A1 * | 4/2007 | Srivastava et al. | 714/4 |

OTHER PUBLICATIONS

Google.com, search term"define:mirroring", pp. 1-3.*
Kosacek, Mike; Vasudevan, Bharath; Building Highly Available Microsoft Clusters with Replicated Storage, DELL, Feb. 2002, [Retrieved on Jun. 6, 2006], Retrieved from the Internet: <URL: http://www.dell.com/content/topics/global.aspx/power/en/ps4q01se_mikebhar?c=us&cs=555&l=en&s=biz>, pp. 2-3.*

* cited by examiner

Primary Examiner—Scott Baderman
Assistant Examiner—Paul F Contino
(74) Attorney, Agent, or Firm—Campbell Stephenson LLP

(57) ABSTRACT

The present invention provides a framework for managing both clustering and data replication in a software system distributed across multiple nodes. The framework includes at least one agent running at nodes comprising the distributed system. The framework also includes a master to coordinate clustering and replication operations. The framework further includes a library of software programs, called primitives, that are used by agents to communicate with the master. The agent(s) obtain cluster status information and replication status information, which are used by the master to manage clustering and replication operations. The framework is designed to work with existing cluster management applications and data replication facilities. The framework provides status information needed for coordinating clustering and replication operations to ensure that applications and data remain in a consistent state for disaster recovery purposes.

36 Claims, 11 Drawing Sheets

Management Environment

Sites and Clusters

Failure of a Site

Master/Slave Cluster Management

Master/Slave Cluster Management and Replication

Class Diagram

FRAMEWORK FOR MANAGING CLUSTERING AND REPLICATION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Two areas of concern when a failure occurs, as well as during the subsequent recovery, are preventing data loss and maintaining data consistency between primary and secondary storage areas. One simple strategy includes backing up data onto a storage medium such as a tape, with copies stored in an offsite vault. Duplicate copies of backup tapes may be stored onsite and offsite. More complex solutions include replicating data from local computer systems to backup local computer systems and/or to computer systems at remote sites.

Not only can the loss of data be critical, the failure of hardware and/or software can cause substantial disruption. Clustering is a strategy wherein computer systems and storage devices are interconnected, typically at high speeds within a local data center, for the purpose of improving reliability, availability, serviceability, and/or performance via load balancing. Redundant interconnections between the computer systems are typically included as well, and the collection of computer systems, storage devices, and redundant interconnections is referred to herein as a cluster. The cluster appears to users as a single highly available system.

Different types of clusters may be established to perform independent tasks, to manage diverse hardware architectures performing similar tasks, or when local and backup computer systems are far apart physically.

Often, computer systems within a cluster use a common pool of storage devices, and the purpose of the cluster is to provide an alternative processing resource for the data on the shared storage devices in the event of failure of one of the computer systems. Only one of the computer systems in the cluster generally provides processing resources with respect to a particular software application. The computer system currently providing processing resources in the cluster for a particular software application is referred to herein as an active node, and other computer systems in the cluster are referred to herein as backup nodes. The terms "active node" and "backup node" are used in the context of a particular software application, such that an active node for one application may serve as a backup node for another application, and a backup node for a third application may serve as an active node for yet another application.

Each clustered computer system typically runs special software to coordinate the activities of the computer systems in the cluster. This software is referred to herein as a cluster management application. A cluster management application may monitor the health of sites in a distributed system and restart an application on another node when the node running the application fails. Typically, cluster management functions are limited to such clustering operations as monitoring, starting, and stopping resources.

In many situations, disaster recovery requires the ability to move a software application and associated data to an alternate site for an extended period, or even permanently, as a result of an event, such as a fire, that destroys a site. For these more complicated situations, strategies and products to reduce or eliminate the threat of data loss and minimize downtime in the face of a site-wide disaster are becoming increasingly available.

Replication facilities exist that replicate data in real time to a disaster-safe location. Data are continuously replicated from a primary node, which may correspond to a computer system in control of a storage device, to a secondary node. The nodes to which data are copied may reside in local backup clusters or in remote "failover" sites, which can take over when another site fails. Replication allows persistent availability of data at all sites.

The terms "primary node" and "secondary node" are used in the context of a particular software application, such that a primary node for one application may serve as a secondary node for another application. Similarly, a secondary node for another application may serve as a primary node for that application.

The term "application group" is used to describe both an application and the corresponding data. If a primary application group on one cluster becomes unavailable for any reason, replication enables both the application and the data to be immediately available using the secondary application group in another cluster or site.

To accommodate the variety of business needs, some replication facilities provide remote mirroring of data and replicating data over a wide area or distributed network such as the Internet. However, different types of storage typically require different replication methods. Replication facilities are available for a variety of storage solutions, such as database replication products and file system replication products, although typically a different replication facility is required for each type of storage solution.

Replication facilities provide such functionality as enabling a primary and secondary node to reverse roles when both are functioning properly. Reversing roles involves such replication operations as stopping the application controlling the replicated data, demoting the primary node to a secondary node, promoting the original secondary node to a primary node, and re-starting the application at the new primary node. Another example of functionality of a replication facility involves determining when a primary node is down, promoting the secondary node to a primary node, enabling transaction logging and starting the application that controls the replicated data on the new primary node. In addition, when the former primary node recovers from failure, the replication facility can prevent the application from starting at the former primary node since the application group is already running at the newly-promoted node, the former secondary node. The transaction log can be used to synchronize data at the former and new primary nodes.

Both clustering and replicating data affect an application group. Clustering activities may involve starting and stopping a node or an application. Starting and stopping nodes and applications affects primary and secondary application group relationships, active and backup node relationships for cluster management, and primary and secondary node replication relationships. Replicating data from one node to another requires proper knowledge of whether nodes are online or offline to properly determine changes in the direction in which data should be replicated or to trigger taking over replication at one node by another node.

Currently, most cluster management applications and replication facilities are sold as independent products, and existing products do not coordinate clustering and replicating data. Situations that may leave data in an inconsistent state, such as continuing to replicate data to an offline node, may arise without coordination between cluster management applications and replication facilities.

What is needed is a framework for a management system that allows automated management of clusters and data replication. The management system should coordinate the management of clusters and replication so that the data produced by both activities are consistent. Cluster and replication activities should not interfere with each other, and the data should be recoverable in the event of disaster. Furthermore, the system should ensure that hardware and software failure can be detected and a backup hardware or software system can take over, while maintaining the replication of data.

SUMMARY OF THE INVENTION

The present invention provides a framework for managing both clustering and data replication in a software system distributed across multiple nodes. The framework includes at least one agent running at nodes comprising the distributed system. The framework also includes a master to coordinate clustering and replication operations. The framework further includes a library of software programs, called primitives, that are used by agents to communicate with the master. The agent(s) obtain cluster status information and replication status information, which are used by the master to manage clustering and replication operations. The framework is designed to work with existing cluster management applications and data replication facilities. The framework provides status information needed for coordinating clustering and replication operations to ensure that applications and data remain in a consistent state for disaster recovery purposes.

In one form, the invention includes a method that includes obtaining cluster status information for clusters including multiple nodes and replication status information for data replication between the nodes. The method further includes managing an operation using the cluster status information and the replication status information in combination, wherein the managing is performed at least in part automatically. The operation corresponds to one of a clustering operation and a replication operation.

In another form, the invention includes a method that includes obtaining cluster status information for clusters including multiple nodes and replication status information for data replication between the nodes. The method further includes automatically providing the cluster status information and the replication status information to a master. The method further includes managing an operation using the cluster status information and the replication status information in combination, wherein the managing is performed by the master. The operation corresponds to one of a clustering operation and a replication operation.

In another form, the invention includes a system including a first agent configured to obtain cluster status information from a cluster management application. The system also includes a second agent configured to obtain replication status information from a replication facility. The system further includes a master configured to manage an operation using the cluster status information and the replication status information in combination. The cluster management application is configured to perform a clustering operation for nodes organized into clusters. The replication facility is configured to perform a replication operation for replicating data between the nodes. The operation corresponds to one of the clustering operation and the replication operation.

In yet another form, the invention includes an interface with a library including a primitive and at least one agent configured to implement at least one entry point. The entry points are implemented to obtain cluster status information from a cluster management application, obtain replication status information from a replication facility, and call the primitive to communicate with a master. The cluster management application is configured to perform a clustering operation for nodes organized into clusters. The replication facility is configured to perform a replication operation to replicate data between the nodes. The master is configured to manage an operation using the cluster status information and the replication status information in combination. The operation corresponds to one of the clustering operation and the replication operation.

In still another form, the invention includes first obtaining means for obtaining cluster status information for multiple clusters including multiple nodes. The invention further includes second obtaining means for obtaining replication status information for data replication between the nodes. The invention also includes managing means for managing an operation using the cluster status information and the replication status information in combination, wherein the operation corresponds to one of a clustering operation and a replication operation.

In yet another form, the invention includes a computer program product comprising first obtaining instructions to obtain cluster status information for multiple clusters including multiple nodes. The computer program product further includes second obtaining instructions to obtain replication status information for data replication between the nodes. The computer program product also includes managing instructions to manage the operation using the cluster status information and the replication status information in combination, wherein the operation corresponds to one of a clustering operation and a replication operation. Finally, the computer program product includes a computer readable medium to store the first and second obtaining instructions and the managing instructions.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

Figure 1:
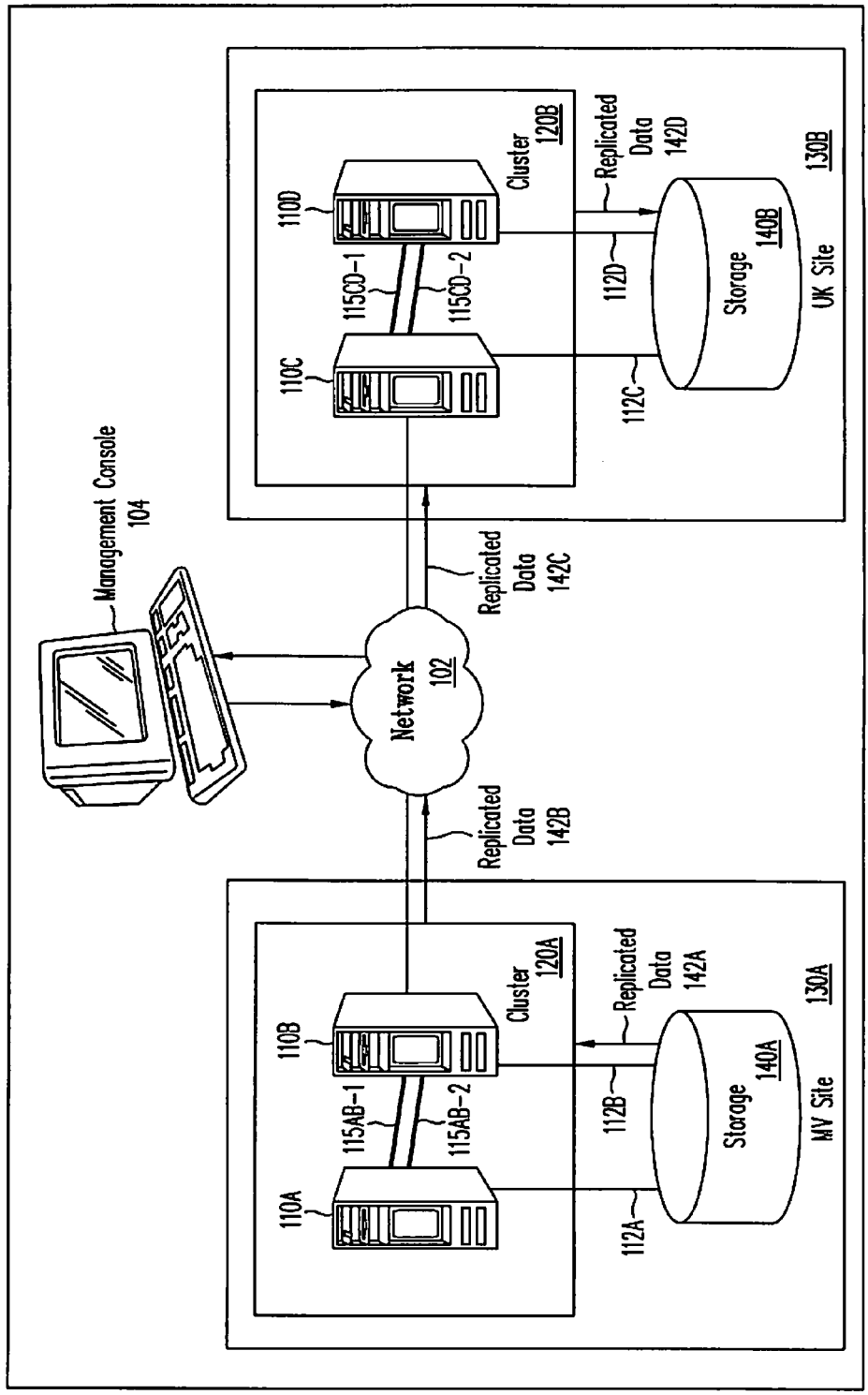
FIG. 1 provides an example of an environment in which the management system and framework of the present invention operates.

While the invention is susceptible to various modifications and alternative forms, specific embodiments thereof are shown by way of example in the Drawings and are described herein in detail. It should be understood, however, that the Drawings and Detailed Description are not intended to limit the invention to the particular form disclosed. On the contrary, the intention is to cover all modifications, equivalents, and alternatives falling within the scope of the present invention as defined by the appended Claims.

DETAILED DESCRIPTION

For a thorough understanding of the subject invention, refer to the following Detailed Description, including the appended Claims, in connection with the above-described Drawings.

Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention operates in an multi-clustered environment in which clusters are used for backup of processing resources and data are replicated to ensure constant data availability. Nodes in the multi-clustered environment typically correspond to server computer systems that communicate using a communication link, typically over a network connecting the nodes. In this environment, a given node may serve as an active node or a backup node with regard to a particular cluster and software application. Typically, the nodes within a cluster are interconnected by a very fast local connection such as a fibre channel connection. Furthermore, nodes in the distributed system may serve as a primary node or a secondary node from a data replication standpoint. Typically, a primary node corresponds to an active node, and a secondary node corresponds to a backup node, although such a correspondence is not strictly required.

The present invention provides a framework for managing both clustering and data replication in a software system distributed across multiple nodes. The framework includes at least one agent running at nodes comprising the distributed system. The framework also includes a master to coordinate clustering and replication operations. The framework further includes a library of software programs, called primitives, that are used by agents to communicate with the master. The agent(s) obtain cluster status information and replication status information, which are used by the master to manage clustering and replication operations. The framework is designed to work with existing cluster management applications and data replication facilities. The framework provides status information needed for coordinating clustering and replication operations to ensure that applications and data remain in a consistent state for disaster recovery purposes.

The framework enables a cluster management application and a replication facility to cooperate to effective disaster recovery plan that is more robust and scalable than either application alone would be. In the event that a data center is destroyed, the application data are immediately available at a remote site, and the application can be restarted at the remote site. The framework enables a cluster manager and replication facility to be used with existing applications having existing data, as well as with new applications as they are introduced.

I. Management Environment

FIG. 1 provides an example of an environment in which the management system and framework of the present invention operates. Nodes 110A and 10B at Mountain View (MV) site 130A and nodes 110C and 110D at United Kingdom (UK) site 130B are shown for purposes of illustration. The invention is not limited to minimum or maximum numbers of nodes and/or sites. While typically the term "site" describes a collection of nodes concentrated at a data center or on a campus such that cables can interconnect the nodes and storage devices, geographic concentration is not a requirement for a site. A site can include one or more clusters of nodes and can be viewed as a virtual collection of one or more clusters.

MV site 130A and UK site 130B are shown as connected via network 102, which typically corresponds to a private wide area network or a public distribution network such as the Internet. Common management console 104 is shown to be used for managing nodes, clusters of nodes, and data replication, although a common management console is not necessary for operation of the invention.

Cluster 120A includes nodes 110A and 110B at MV site 130A, which are connected via redundant cluster connections 115AB-1 and 115AB-2. Although only one cluster is shown at MV site 130A, any number of clusters may be included at a site. Node 110A shares common storage 140A with node 110B. Node 110A is interconnected with storage 140A via interconnection 112A, and node 110B is interconnected with storage 140A via interconnection 112B.

Similarly, cluster 120B includes nodes 110C and 110D at UK site 130B, which are connected via redundant cluster connections 115CD-1 and 115CD-2. Node 110C shares common storage 140B with node 110D. Node 110C is interconnected with storage 140B via interconnection 112C and node 110D is interconnected with storage 140B via interconnection 112D.

Replicated data flow from storage 140A via replication data points 142A, 142B, 142C and 142D to storage 140B. Storage 140A and 140B are shown as local storage devices for each of sites MV site 130A and UK site 130B, although storage for a particular site may be accessed via network 102 or may comprise a storage array managed by a storage server (not shown) on a storage area network (not shown).

In an example embodiment, nodes 110A through 110D are configured as servers for the same application program. Each of clusters 120A and 120B is connected to shared storage such as fibre channel RAID arrays via a separate fibre switch using redundant fibre channel connections. Redundant interconnections 115AB-1, 115AB-2, 115CD-1 and 115CD-2 are redundant heartbeat private network connections via crossover cables between redundant network interface cards (NICS) when two nodes form the cluster. When more than two nodes form the cluster, the private network connection uses a hub. The private network enables fail over software to recognize when a system or process has failed. Each of clusters 120A and 120B has redundant public network connections to communicate via a public network such as the Internet. Redundant power sources are also included in the event of a power failure.

II. Cluster Management

To ensure disaster recovery, data loss must be prevented and consistent data maintained even if hardware or software failures occur. Data for a particular application should not be allowed to enter a state in which the failure of the network or a node would leave that application and corresponding application data in an inconsistent or unusable state.

Cluster management applications enable administrators to manage multiple, discrete clusters from a single application. By coordinating events and actions across clusters, cluster management applications provide a useful tool for managing disaster recovery. For example, a second cluster may take over an application running on a primary cluster when no node within the primary cluster can run the application. Examples of commercially available cluster management applications include VERITAS® Global Cluster Manager™, Hewlett-Packard® MC/Service Guard, and Microsoft® Cluster Server (MSCS).

In some cluster management applications, a process called the site master at each site may connect to one or more site slave processes within the site. The site master collects all information about all of the clusters and nodes in that site. In addition, each site master may connect to all other site masters in the distributed system to share information so all site masters have information about the entire distributed system. While it is not a requirement that each site have its own master for operation of the invention, a master must have detailed information, sometimes at the software process level, about the state of hardware and software resources at the site. The term master refers to a site master and is also referred to herein as a master process.

Typically, a cluster management application constantly monitors the state of software applications in multiple clusters and can determine if an entire site becomes unavailable, such that no node in the clusters at the site is available to run the software application. The cluster management application may start the software application at a secondary site unaffected by the circumstances that made the primary site unavailable. A cluster management application may be controlled by a user via a user interface, or the cluster management application may be configured to act automatically.

In the event that the primary data center is destroyed, the application data must be immediately available at another site, and the application must be immediately started at the other site. This level of availability requires replication of the data from the primary site to the other site. Various data replication applications are available for replicating data across sites, including VERITAS® Volume Replicator™ (VVR), Symmetrix Remote Data Facility (SRDF®) by EMC® Corporation, Hitachi® Asynchronous Remote Copy (HARC), Sybase® Replication, and Continuous Access by Hewlett-Packard®.

Figure 2A:
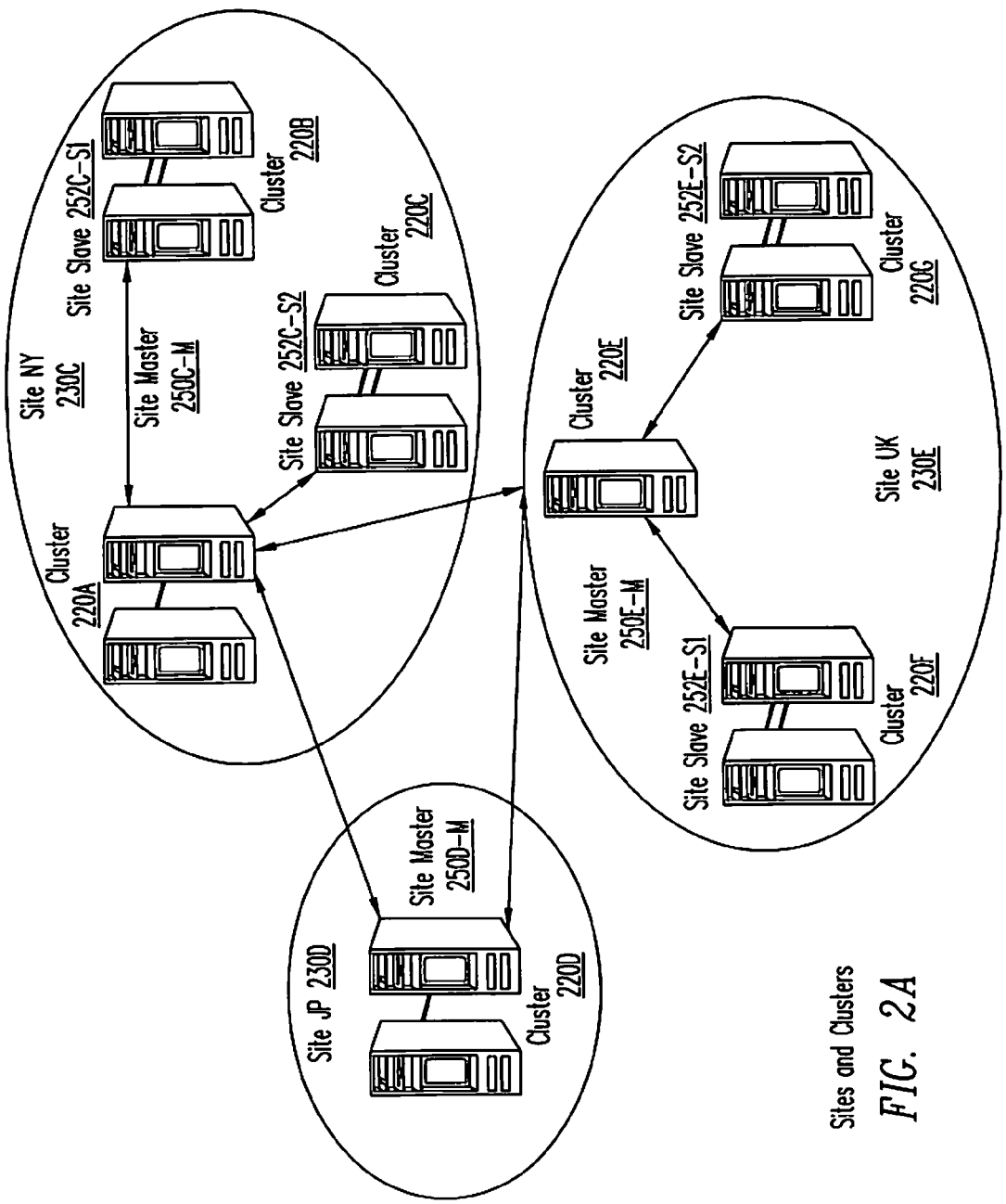
FIG. 2A shows an example of a site and cluster configuration.

FIG. 2A shows an example of a site and cluster configuration. Three sites are located, respectively, in New York (NY), Japan (JP) and the United Kingdom (UK), Site NY 230C, site JP 230D and site UK 230E are interconnected in a distributed system. Each site includes a cluster that includes a master process or program, also referred to herein as a master, for purposes of cluster and replication management. Each site may also include one or more clusters that include slave processes or programs to serve as slaves to the master. The master and slaves may run on the same node.

Site NY 230C includes cluster 220A, which starts site master 250C-M, and clusters 220B and 220C starting, respectively, site slaves 252C-S1 and 252C-S2. Site JP 230D includes cluster 220D, which starts site master 250D-M, but no clusters starting slave processes. Site UK 230E includes cluster 220E, which starts site master 250E-M, and clusters 220F and 220G starting, respectively, site slaves 252E-S1 and 252E-S2. Note that cluster 220E includes a single node, whereas each of the other clusters includes two nodes.

Figure 2B:
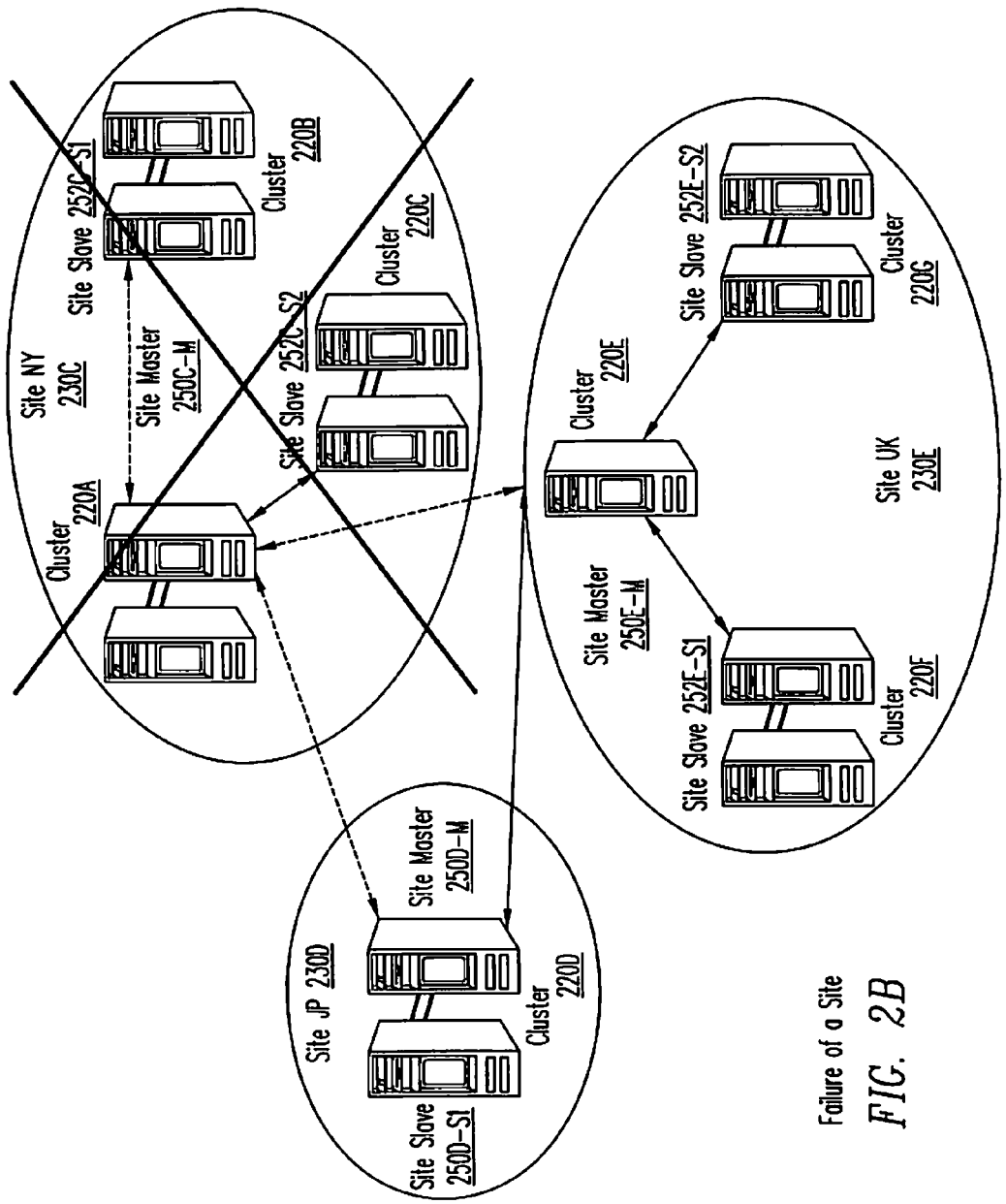
FIG. 2B shows an example of the failure of a site in the distributed system of FIG. 2A.

FIG. 2B shows an example of the failure of a site in the distributed system. Site NY 230C has failed, and site master 250C-M running on cluster 220A is disconnected from communicating, as shown by the dotted arrows, with the other site masters 250D-M running on cluster 220D at site JP 230D and 250E-M running on cluster 220E and site UK 230E. If site JP 230D or site UK 230E is capable of acting as a server for the application program(s) serviced at site NY 230C, then the cluster management application may start the application program(s) at the alternate site until site NY 230C returns to service.

Figure 3:
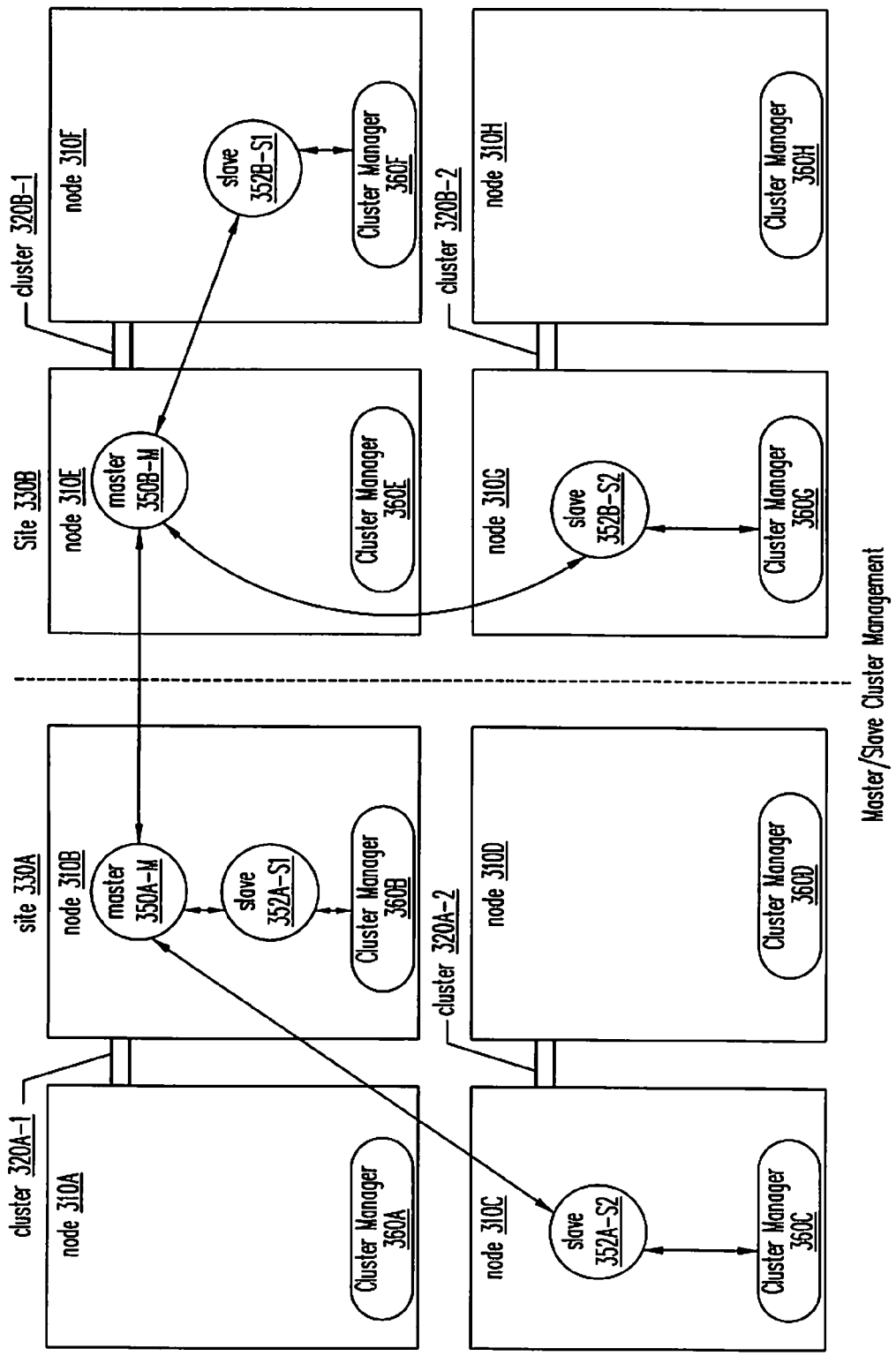
FIG. 3 shows an example of a master/slave configuration for cluster management.

FIG. 3 shows an example of a master/slave configuration for cluster management. Each of nodes 310A through 310H includes a process called a cluster manager, respectively labeled cluster manager 360A through 360H, which gathers information related to clusters and changes in status for clusters. Site 330A includes clusters 320A-1, having nodes 310A and 3101B, and 320A-2, having nodes 310C and 310D. Site 330B includes cluster 320B-1, including nodes 310E and 310F, and cluster 320B-2, having nodes 310G and 310H. Each of sites 330A and 330B may include various resources in addition to the nodes and clusters, such as other software processes and hardware components.

At site 330A, site master 350A-M and site slave 352A-S1 run on node 310B in cluster 320A-1, and site slave 352A-S2 runs on node 310C in cluster 320A-2. At site 330B, site master 350B-M runs on node 310E in cluster 320B-1, site slave 352B-S1 runs on node 310F at cluster 320B-2, and site slave 352A-S2 runs on node 310G in cluster 320B-2. When each cluster manager 360A through 360H obtains information about a change in state for a cluster, the cluster manager can forward cluster status information to a local slave process, also referred to herein as a slave. The slave process can forward the information to the site master, which in turn can forward the information to all other site masters in the distributed system.

A cluster management application may manage applications, keep track of the online/offline status of the applications, and perform fail overs (switching an online application to offline, and switching an offline application group to online to take the formerly online application group's place), with or without alert/notification. Status, alerts and notification can be represented via attributes of various objects and events within the cluster management application. However, most cluster management applications do not present the status of the data (replicated across sites in most of the cases) to other applications, such as replication facilities. The framework of the present invention provides replication status information to be shared with cluster management applications and other types of applications.

III. Replication Management

In the environment described above, data from a primary node are replicated to maintain a consistent copy of data at a secondary node. Typically, a secondary node is remote from the physical location of the primary node and can be accessed via network, although it is not a requirement that the secondary node be physically remote. Each of the primary and secondary nodes may be part of a cluster in which multiple computer systems are configured to serve either as an active node or a backup node for the cluster.

Data are replicated from a primary node, where an application program is running, to one or more secondary nodes. A set of data on the primary node, and its counterparts on the secondary nodes, make up a Replicated Data Set (RDS). The designations of primary and secondary nodes are used in the context of a particular Replicated Data Set (RDS).

A given node can serve as a primary node for one application program, and a secondary node for another application program. Furthermore, for the same application program, a given node can serve as a secondary node at one point in time, and later as a primary node to "cascade" replication of the data to other nodes connected via communication links. For example, a first replication may be made between network nodes in different cities or states, and a node in one of the cities or states can serve as the primary node for replicating the data world-wide.

Each replication primary node can have more than one replication secondary node. As used herein, a reference to the secondary node implicitly refers to all secondary nodes associated with a given primary node because, typically, the same replication operations are performed on all secondary nodes.

Replication facilities provide such functionality as enabling primary and secondary nodes to reverse roles when both are functioning properly. Reversing roles involves replication operations such as stopping the application controlling the replicated data, demoting the primary node to a secondary node, promoting the original secondary node to a primary node, and re-starting the application at the new primary node. Another example of functionality of a replication facility is called fail over, which involves determining when a primary node is down, promoting the secondary node to a primary node, enabling transaction logging, and starting the application controlling the replicated data on the new primary node (sometimes referred to as a "fail back").

In addition, when the former primary node recovers from failure, the replication facility can prevent the application from starting at the former primary node, since the application is already running at the secondary node. An administrator may use the transaction log to synchronize data at the former and new primary nodes.

Replication is unidirectional for a given set of data. Writes of data on the primary node are sent to the secondary nodes, but access to the data at the secondary nodes is typically read-only. If read/write access to a secondary set of data is required, (after a primary node crash, for example), replication can be halted for that set of data. If data are then written to storage areas on secondary nodes, a synchronization process can be performed when the primary node comes back up so that both sets of data are again identical before resuming replication of data.

Replication of data can be performed synchronously or asynchronously. With synchronous replication, an update is posted to the secondary node and acknowledged to the primary node before completing the update at the primary node. In the event of a disaster at the primary node, data can be recovered from the secondary node without any loss of data because the copies of the data at the primary and secondary nodes contain the same data. With asynchronous replication, updates to data are immediately reflected at the primary node and are persistently queued to be forwarded to each secondary node. Data at the secondary node can lag behind data at the primary node during peak update times. A decision regarding whether to replicate data synchronously or asynchronously depends upon the nature of the application program using the data as well as numerous other factors, such as available bandwidth, network round-trip time, the number of participating servers, and the amount of data to be replicated.

Under normal circumstances, updates, also referred to herein as writes, are sent to the secondary node in the order in which they are generated at the primary node. Consequently, the secondary node represents a state of the primary node at a given point in time. If the secondary node takes over due to a disaster, the data storage areas will be consistent.

Application data should not be allowed to enter a state in which the failure of the network or the primary node would leave that application data in an inconsistent and unusable state. During normal operation, data loss can be prevented by logging all writes and ensuring that this operation completes before attempting any writes to the primary and secondary data storage areas.

Data consistency is ensured by coordinating operations such that they occur in the same order on each secondary node as on the primary node. Consequently, data storage modifications occur in the same order on both the secondary and the primary node. If a primary or secondary node crashes, recovery includes locating the last entry that had not yet been acknowledged by the secondary node as having been successfully written, before the crash. Operation can continue from that point. However, a window of requests may exist between the last acknowledged request and the last request that was sent to the replication storage group before the crash. The data in this window may or may not have been written to the secondary node data storage areas. To ensure the consistency of the secondary node, all the requests that were made during this window can be written as a single atomic unit, referred to herein as an atomic write. No read requests are allowed on the secondary node until the atomic write is complete. This requirement ensures that no application can access the replication storage group while its state is inconsistent.

Figure 4:
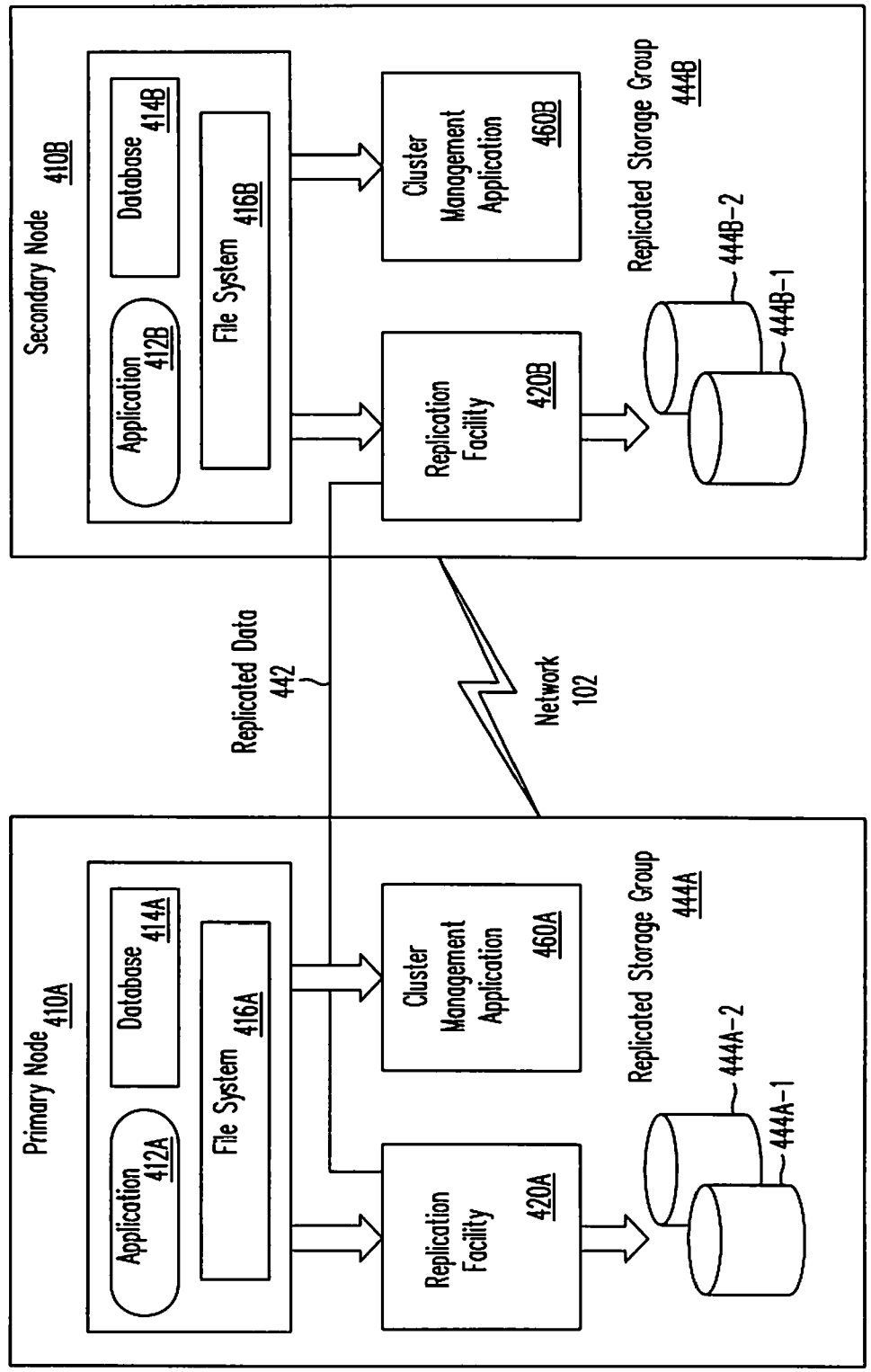
FIG. 4 shows a detailed view of a configuration for replication management.

FIG. 4 shows a detailed view of a configuration for replication management. Primary node 410A includes an application program 412A, a database 414A, and a file system 416A. Cluster management application 460A and replication facility 420A can obtain data from at least one of application program 412A, database 414A, and file system 416A. Replication facility 420A stores the data in replicated storage group 444A, comprising storage units 444A-1 and 444A-2. Each of application program 412A, database 414A, file system 416A, replicated storage group 444A, and storage units 444A-1 and 444A-2 can be considered to be a resource.

Secondary node 410B includes corresponding copies of application 412A, database 414A, and file system 416A, respectively labeled application 412B, database 414B, and file system 416B. These respective copies can perform the functions of primary node 410A in the event of disaster. Alternatively, programs and other files associated with the application, database and file system may be stored in a data storage area on the primary node and replicated along with the data. Should the secondary node itself need to replicate data, the programs and other files can be extracted from the data at the secondary node. Corresponding copies of replication facility 420A and cluster management application 460A also reside on secondary node 410B, respectively, replication facility 420B and cluster management application 460B. These copies enable secondary node 410B to perform functions similar to those performed at primary node 410A and to manage clusters and replicate data to other secondary nodes.

Replication facility 420A transfers data from replicated storage group 444A to replicated storage group 444B, as shown by the arrow indicating transfer of replicated data 442 from replication facility 420A to replication facility 420B. Data transfer is typically performed over a communication link, such as network 102, between the primary and secondary nodes.

Replication Storage Groups

A set of data storage areas that are replicated as a unit is referred to herein as a replicated storage group (RSG), such as replication storage group 444A. Storage areas in a replicated storage group are under the control of an application, such as application 412A or database 414A of FIG. 4, that requires write-order fidelity among the updates to the storage areas. An application such as application 412A of FIG. 4 manages data in a primary replication storage group, such as RSG 444A. Replication facility 420A then replicates the data to one or more secondary replication storage groups, such as secondary RSG 444B, at secondary nodes. Write ordering is strictly maintained within a replication storage group during replication to ensure that each remote storage area is always consistent, both internally and with all other storage areas of the replication storage group. Storage areas that are associated with a replication storage group and contain application data are called application data storage areas.

Communication Links

In an object-oriented embodiment of the invention, communication links between the primary and secondary nodes can be represented as communication link objects (not shown in FIG. 4). Communication link objects can be associated with replication storage groups. Each communication link object on a primary replication storage group, such as RSG 444A, represents the communication link from the primary replication storage group to a corresponding secondary replication storage group, such as RSG 444B. A communication link object on a secondary replication storage group represents the communication link from the secondary replication storage group to the corresponding primary replication storage group. A secondary node typically serves as a replication node for only one primary and typically has one associated communication link object referencing its primary node. A primary replication storage group can have one or more associated communication link objects for its secondary nodes. If a secondary node is "promoted" to assume the role of a primary node, then the newly-promoted node can have multiple communication link objects for other nodes that were previously secondary to the "demoted" primary node.

As mentioned above, replication of data can be performed in synchronous or asynchronous mode. The mode of replication can be set up for each communication link object, depending on the requirements for the specific application. Communication link objects in a replication storage group can be set to replicate in different modes.

IV. Framework for Managing Clustering and Replication

The framework of the present invention enables automated management of clustering in conjunction with monitoring and managing the replication process. An administrator can use the framework to establish policies for coordinating clustering and replication activities. The framework of the present invention includes providing the replication status, cluster status and statistics needed by administrators to protect against data loss and minimize disruption to application users upon failure of a node in the distributed system.

The framework provides a set of replication and clustering operations that can be implemented in the form of one or more agents, such as a replication agent and/or a clustering agent. Multiple agents run on different nodes in the distributed system and communicate using the functions implemented by each agent. The agent implementation should provide information about replication status and cluster status for making decisions about resources to take on- or off-line and/or nodes to promote and/or demote for replication. Furthermore, the replication status, cluster status and statistics can be displayed in a GUI such as the management console 104 of FIG. 1 and within a command line interface as output.

The description herein will include discussions of a replication agent and a slave as a cluster agent, although one of skill in the art will recognize that a single agent may implement functionality for both clustering and replication. An agent should be capable of performing tasks such as obtaining status information and/or statistics and populating that information to a data structure, obtaining instantaneous values for dynamically changing information, sending a log message to a site master when any error is detected, and taking a user-specified action.

The framework described herein may be used in conjunction with any type of replication facility and/or cluster management application. In particular, the framework can be used in conjunction with cluster management applications such as VERMIAS® Global Cluster Manager, Hewlett-Packard® MC/Service Guard, and Microsoft® Cluster Server; database management systems such as Oracle®, Sybase®, Informix®, DB2®, and SQL Server®; backup products such as VERITAS® Netbackup and IBM® Tivoli; mail servers such as Microsoft Exchange; file systems such VERITAS® file system (VxFS), UNIX® file system (UFS), journal file systems (JFS and J2FS), extent file system (ext2FS), and Windows® NT file system (NTFS); web servers such as Internet Information Server, Netscape® Enterprise Server, WebLogic®, iplanet®, and Apache®, other versioning products; or any other application replicating data and/or managing clusters.

Figure 5:
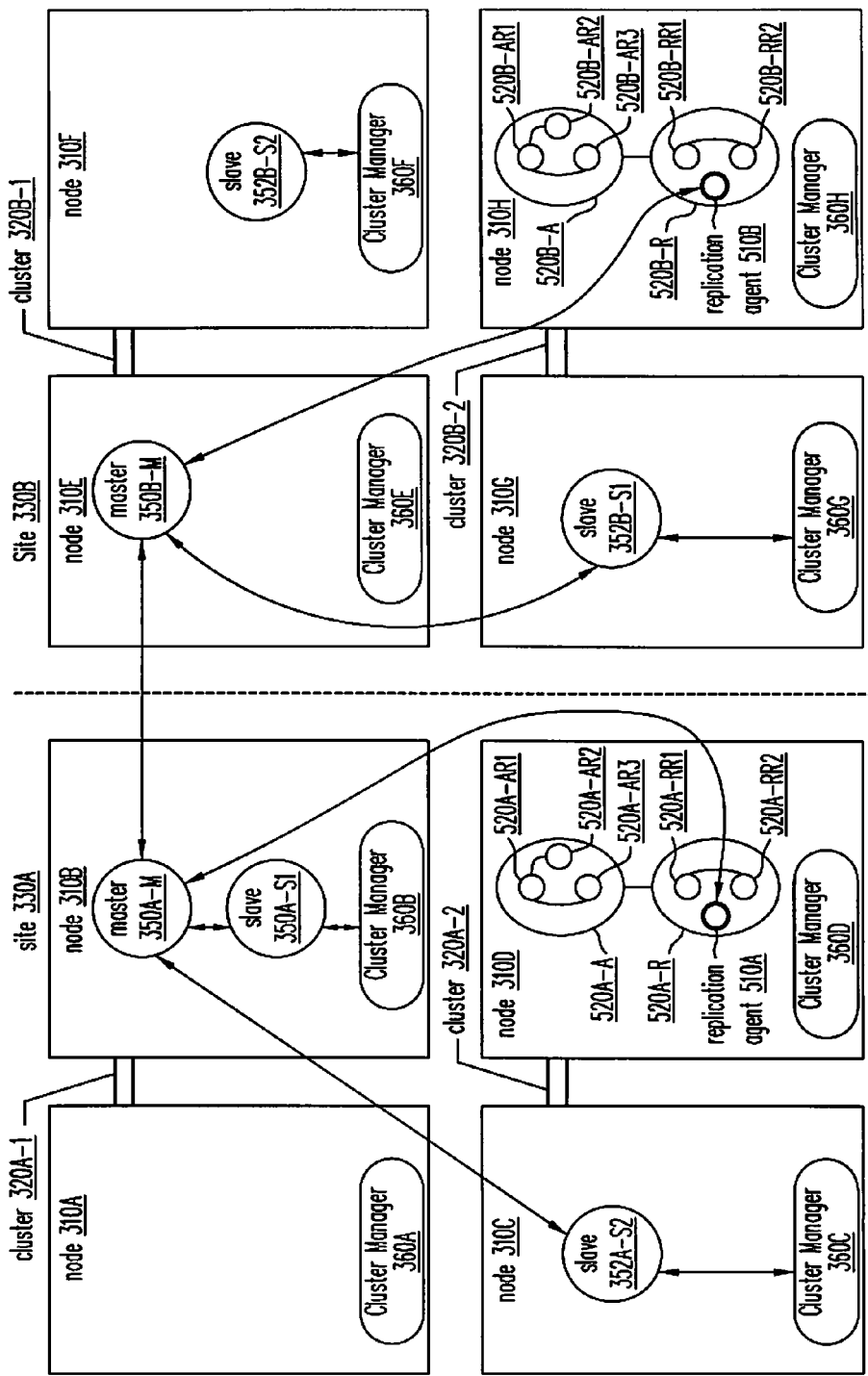
FIG. 5 shows a framework combining the master/slave configuration for managing clusters of FIG. 3 with a replication agent for replicating data.

FIG. 5 shows a framework combining the master/slave configuration for managing clusters of FIG. 3 with a replication agent for replicating data. Recall that master 350A-M controls clustering and replication activity at site 330A. Cluster managers 360A, 360B, 360C and 360D coordinate with one slave process for each cluster, slaves 352A-S1 and 352A-S2, to gather cluster status information.

Each site 330A and 330B has a master, respectively master 350A-M and master 350B-M, that coordinates replication and clustering operations at the respective sites. Site 330A has application group 520A-A and replication group 520A-R. Application group 520A-A includes three resources, 520A-AR1, 520A-AR2, and 520A-AR3. For example, resource 520A-AR1 can correspond to an Oracle application, resource 520A-AR2 can correspond to a networking component connecting a client to the Oracle database, and resource 520A-AR3 can correspond to a file system. In such an implementation, resource 520A-AR1, the Oracle application, is dependent upon both resource 520A-AR2, the file system, and resource 520A-AR3, the networking component, to operate.

An application group can be configured with an "exclusive online" setting, indicating that only one instance of the application group should be online at any point in time. For example, if an application group has an "exclusive online" setting and is online at site 520A, automatically generated events ensure that the application group is offline at site 520B. Likewise, if the application group is brought online at site 520B, the corresponding application group at site 520A is taken offline.

Replication group 520A-R also includes two resources, 520A-RR1 and 520A-RR2, and a replication agent 510A. Resource 520A-RR1 can correspond to a replication facility, and resource 520A-RR2 can correspond to a replication storage group (RSG) manager. Replication agent 510A gathers replication status information within the replication group. The replication storage group manager must be operational for the replication facility to operate. Replication agent 510A runs independently of both the replication facility and the replication storage group manager.

Site 330B has application group 520B-A and replication group 520B-R. Mirroring application group 520A-A, application group 520B-A includes three resources, 520B-AR1, 520B-AR2, and 520B-AR3. These resources mirror the resources for application group 520A-A. Resource 520B-AR1 corresponds to an Oracle application, resource 520B-AR2 corresponds to a networking component connecting Oracle to a database, and resource 520B-AR3 corresponds to a file system.

In this embodiment, only one instance of an application group, here application group 520A-A, runs at an active node, here active node 310D. Application group 520B-A is a backup group on backup node 310H. Application group 520B-A can run the Oracle application if no node or cluster at site 330A can.

Replication group 520B-R also includes two resources, 520B-RR1 and 520B-RR2, and a replication agent 510B. Mirroring replication group 520A-R, resource 520B-RR1 corresponds to a replication facility, and resource 520B-RR2 corresponds to a replication storage group (RSG) manager. Replication agent 510B obtains replication status information that is used by master 350B-M to manage clustering and replication operations. Unlike application groups 520A-A and 520B-A, however, both replication groups 520A-R and 520B-R are actively involved in replication and are running simultaneously.

In some environments, a separate replication group may not be maintained for replicating data; for example, hardware with built-in replication facilities may not require a separately-managed replication group. In such an environment, only one replication agent for the secondary node may be needed.

Framework Interface

The framework interface between a cluster management application and a replication facility consists of entry points and agent primitives. Entry points are the functions that the agent developer implements as part of an agent, such as a replication agent or clustering agent. A replication agent includes entry points and uses agent primitives specific to replicating data from a framework library, and a cluster agent includes entry points and uses agent primitives specific to cluster management from the framework library. Entry points and agent primitives are discussed separately below with reference to replication operations and clustering operations, although one of skill in the art will recognize that all of the entry points and primitives may be implemented for a single agent.

Entry points for an agent may be developed, for example, in C++ or a scripting language, such as Perl or Shell. Agent primitives are methods for communication between agents and a master, including defining the entry points and logging messages.

Replication Entry Points

The framework supports the following replication entry points:
 RepGetEntryPoints( )
 RepInitialize( )
 RepGetInfo( )
 RepAction( )
 RepClean( )
 RepShutdown( )

Each of the replication entry points corresponds to a replication operation, although the above list is not exhaustive of replication operations. Many additional replication operations can be implemented using the framework of the present invention.

The framework supports the following Replication Primitives:
 RepSetEntryPoints
 RepLogMsg The replication entry points are described herein using C++ syntax, although one of ordinary skill will understand that other languages may be used to implement the framework entry points. When the language implementing the entry points is script-based, parameters can be passed as command-line arguments and the exit code can be considered the return value. In one embodiment, the replication agent developer must implement all entry points indicated as mandatory below. Examples of entry points are described in detail below.

RepGetEntrPoints( )
 unsigned int RepGetEntryPoints( ) mandatory

The RepGetEntryPoints entry point enables a replication agent to obtain pointers to implementations of other entry points. The RepGetEntryPoints method is called when the replication agent is started. The replication agent calls RepGetEntryPoints by name, and thus must include an implementation of the RepGetEntryPoints method.

RepInitialize( )
 unsigned int RepInitialize(const char*SysName) optional

The RepInitialize entry point is called to perform initialization before replication status information is populated in the data structures. The replication agent may or may not implement the RepInitialize entry point. The RepInitialize entry point is called before the replication agent starts gathering replication status information.

RepGetInfo( )
 unsigned int RepGetInfo(const char*SysName) mandatory

The RepGetInfo entry point is called periodically to obtain replication status information for the replication processes being administered. In one embodiment, the replication period is the value of an attribute RepMonitorInterval and can be configured in a configuration file. Replication configuration information is passed to the replication agent by the master process in a snapshot when the replication agent registers with the master process. Any dynamic updates in the configuration file can be delivered to the replication agent from the master process. The standard output (stdout) of the RepGetInfo entry point is captured and sent to the master process.

RepAction( )
unsigned int RepAction(const char*SysName) optional

The RepAction entry point is used to take an action in the replication process. The action that is taken is dependent upon the implementation of the replication agent. Examples of actions that are taken for replication are further described with reference to replication agents below.

RepClean( )
unsigned int RepClean(const char*SysName,RepAgentWhyClean reason) optional The RepClean entry point is used to do necessary cleanup. The reason attribute value provides the reason for the cleanup. For example, the RepClean entry point can be called to perform cleanup activities in case of failure of the RepAction entry point. The return value indicates whether RepClean( ) was successful (0) or not (1).

The framework calls RepClean( ) when replication information is not obtained in a specified amount of time, such as when RepGetInfo( ) does not return replication information, or when RepAction( ) returns an error or does not return.

RepAgentWhyClean returns one of an enumerated list of values given below:
RepActionHung
RepActionFailed
RepShutdown( )
void Repshutdown (void) optional The RepShutdown entry point is called before the replication agent shuts down. No parameters are provided, and the RepShutdown entry point returns no value. Most replication agents do not require this functionality and may not implement this entry point.

Replication Agent Primitives

This section describes the framework replication primitives. Primitives are the methods implemented by the framework and are available for use by replication agent developers.

RepSetEntryPoints
void RepSetEntryPoints(RepEntryPointStruct& entry_points)

The RepSetEntryPoints primitive requests the framework to use the entry point implementations given in entry_points. The RepSetEntryPoints primitive is called from the RepGetEntryPoints( ) entry point. An example of the RepEntryPointStruct data structure is provided below:

Typedef struct
{
unsigned int (*RepInitialize) (const char*SysName);
RepState (*RepGetInfo) (const char* SysName, char* buffer);
unsigned int (*RepAction) (const char* SysName, char* buffer);
unsigned int (*RepClean) (const char*SysName, RepAgentwhyClean reason);
void (RepShutdown) (void),
} RepEntryPointStruct;

RepEntryPointStruct is a structure consisting of function pointers, one for each replication agent framework entry point except RepGetEntryPoints( ), which is called by name in the embodiment described herein.

RepLogMsg
void RepLogMsg(int tag, cont char* message, int message-id, VList *arg vlistp, int flags)

The RepLogMsg primitive is used to request to log a message into the replication agent's log file. The replication agent may be instructed to use a different log file by configuring the log_file attribute for the replication agent. An interface for script-based entry point implementations is also provided.

Clustering Entry Points

The framework supports the following clustering entry points:
AgStartup( )
Open( )
Close( )
Online( )
Offline( )
Clean( )
AgResStateMonitor
Attr_changed( )
Shutdown( )

Each of the clustering entry points corresponds to a clustering operation, although the above list is not exhaustive of clustering operations. Many additional clustering operations can be implemented using the framework of the present invention.

The framework supports the following clustering agent primitives:
AgSetEntryPoints( )
AgSetCookie( )
AgRegister( )
AgUnregister( )
AgGetAttr( )
GetCookie( )
AgLogMsg( )
AgLogConsoleMsg( )
AgExec( )
AgStartup( )

The AgStartup entry point allows a developer implementing an agent to obtain the entry point implementations (other than AgStartup) to communicate with the master. A primitive that is called for this purpose is AgSetEntryPoints( ), which is described in further detail below.

The AgStartup( ) method can also perform other initialization, such as registering with the agent for attribute change notification.

The AgStartup( ) entry point is called when an agent is started. Each agent calls the AgStartup( ) entry point by name, as opposed to using function parameters for the other entry points. In one embodiment, each agent implements a method with the name AgStartup( ).

Qpen( )
void open(const char *resource_name, void **attributes)

The open( ) entry point opens a resource. The open( ) method is called when an agent starts managing a resource.

Close( )
void close(const char *resource_name, void **attributes)

The close( ) entry point is called when an agent stops managing a resource.

Online( )
unsigned int online(const char *resource_name, void **attributes)

The online( ) entry point brings a resource online. The return value indicates how long (in seconds) to wait before calling the monitor( ) entry point to determine the actual status of the resource.

Offline( )
unsigned int offline(const char *resource_name, void **attributes)

Brings a resource offline. The return value indicates how long (in seconds) to wait before calling the monitor( ) entry point to determine the actual status of the resource.

Clean( )
unsigned int clean(const char *resource_name, AgWhyClean reason, void **attributes)

The clean( ) entry point is called when a resource needs to be taken offline immediately. The clean( ) entry point terminates the availability of a resource, i.e., forcibly brings a resource offline if the resource is online. The reason the resource is being brought offline is provided via the reason parameter. The return value indicates whether clean was successful (0) or not (1).

An agent can call clean( ) for a resource that has not completed an online/offline operation within the time specified or when the online/offline method returned an error.

AgWhyClean is an enumerated list of reason types. The possible values for reason types include the following: AgCleanOfflineHung, AgCleanOfflineIneffective, AgOnlineHung, AgOnlineIneffective and AgUnexpectedOffline.

Monitor( )
AgResState monitor(const char *resource_name, void **attributes, int *confidence_level)

The monitor( ) entry point determines that state and confidence level of a resource. Monitor( ) is called periodically and indicates whether the resource is online or offline via the AgResState variable. In one embodiment, AgResStateMonitor( ) returns the state as AgResOnline or AgResOffline. Confidence_level is an output parameter that can be used to indicate a potential problem with an online resource.

Att changed
void att_changed(const1 char *resource_name, const char *attribute_name, void *new_value)

The att_changed( ) entry point allows an agent to respond to changes to the values of attributes of interest.

Shutdown( )
void shutdown( )

The shutdown( ) entry point performs re-initialization of variables and clean up in order to shut down an agent.

Clustering Agent Primitives

Primitives are the methods implemented in the framework library and are available for use by the agents.

AgSetEntryPoints
void AgSetEntryPoints(AgEntryPointStruct& entry_points)

The AgSetEntryPoints primitive is used by an agent to request to use the entry point implementations given in the parameter entry_points. The AgSetEntryPoints primitive is typically called from within the AgStartup( ) entry point implementation.

An example of the entry point structure is provided below:
typedef struct {
void (*open) (const char *res_name, void **attr_val);
void(*close) (const char *res_name, void **attr_val);
AgResState (*monitor) (const char *res_name, void **attr_val, int *conf level);
unsigned int (*online) (const char *res_name, void **attr_vale);
unsigned int (*offline) (const char *res_name, void **attr_vale);
void (*attr_changed) (const char *res_name, const char *attr_name, void *new_val);
unsigned int (*clean) (const char *res_name, AgWhyClean reason, void **attr_val);
void (*shutdown) ( )
} AgEntryPointStruct As shown above, AgEntryPointStruct is a structure consisting of function pointers, one each for every agent entry point (except the AgStartup( ) entry point, which is called by name.) If an agent does not implement an entry point, the agent should set the corresponding field to NULL.

AgSetCookie
void AgSetCookie(const char*name, void *cookie)

The AgSetCookie primitive is called by an agent to request to store a cookie. The cookie can be obtained later by calling the primitive AgGetCookie( ) described below. In one embodiment, the cookie is not stored persistently and does not survive termination of the agent.

AgRegister
void AgRegister(const char *notify_res_name, const char *res_name, const char *attribute)

An agent calls the AgRegister primitive to notify the resource notify_res_name (by calling the attribute_changed( ) entry point) when the value of attribute is changed for the resource res_name.

AgUnregister
void AgUnregister(const char *notify res_name, const char *res_name, const char *attribute)

An agent calls the AgUnregister( ) primitive to request not to notify the resource notify_res_name about changes in the value of attribute for the resource res_name.

AgGetAttr
char *AgGetAttr(const char *res_name, const char *attribute)

An agent uses the AgGetAttr( ) primitive to request the current value of attribute for the resource res-name.

AgGetCookie
void *AgGetCookie(const char *name)

An agent uses the AgGetCookie( ) primitive to get the cookie set by an earlier call to AgSetCookie( ). The AgGetCookie( ) primitive returns NULL if the cookie was not set earlier.

AgLogMsg
void AgLogMsg(int tag, const char *message, int flags)

An agent uses the AgLogMsg primitive to request to log a message to the agent log file. The agent can request to write to a different log file by configuring the log file attribute of <resource_type>. In one implementation, tag can be any value from TAG_A to TAG_Z. Flags can be have one or more of the following values: LOG_NONE, LOG_TIMESTAMP, LOG_NEWLINE, and LOG_TAG. The default value for flags is LOG_TIMESTAMP | LOG_NEWLINE | LOG_TAG.

AgLogConsoleMsg
void AgLogConsoleMsg(int tag, const char *message, int flags)

An agent uses the AgLogConsoleMsg to request to log a message to the log for the cluster manager (engine).

AgSetEntryPoints
void AgSetEntryPoints(AgEntryPointStruct& entry_points)

The AgSetEntryPoints( ) primitive forks a new process, executes the program specified by path with argv as the arguments (see AgEntryPointStruct above), waits for the execution of the program to complete and returns the status. If buf is not NULL, then a maximum of (buf_size_1) bytes from the from stdout/stderr will be copied to buf. It the total size of the messages sent by the program to stdout/stderr is more than bufsize, only the first (buf_size_1) characters will be copied.

Replication and Cluster Configuration

This section provides an example of the steps that can be taken to configure a distributed system to operate with the framework of the present invention. In this example, two sites are configured for replication using a replication agent for a replication facility such as VERITAS Volume Replicator. One of skill in the art will recognize that replication agents for other replication facilities may require different configuration steps. This section includes the following sub-sections:

Site Setup describes setting up the hardware configuration necessary to achieve both localized high availability and disaster tolerance.

Cluster Configuration describes the recommended cluster configuration for management by the cluster management application.

Relationship Configuration illustrates the steps of creating a global application that automatically configures and manages a replication agent for a given replication facility, including the necessary attribute definitions.

Replication Agent Setup describes the capabilities of the replication agent, including how its actions can be used to perform basic replication functionality in a cluster management application environment.

Command Line Interface describes an example of a command that supports various options for initiating planned replication actions including migration and synchronization. Also described is a gagrp-migrate command for single command application migration across clusters.

Site Setup

At least two sites for the distributed system should be configured by following the steps below:

1. Set up two disparate sites with a minimum 2-node cluster in the active cluster. The secondary cluster may be a 1-node cluster; however, at least 2 nodes are recommended for high availability in the second site.

2. Attach each node in the same cluster to the same storage device.

3. Assure that the systems are visible to each other over a WAN so that they can replicate data as well as run the cluster management application, which can manage both clusters from a single console.

On each cluster, perform the following:

Configure the cluster to contain a diskgroup with two or more disks and one or more mirrored volumes.

Use the replication facility to group those volumes into a replicated storage group that replicates the volumes to an identical set configured as a replicated storage group attached to the remote cluster.

Ensure that the replication facility is configured correctly and that the counterpart replication facilities can connect and replicate data regardless of whether they are configured as part of a cluster.

Cluster Configuration

Once the replication configuration is established, configure application groups and replication groups on each cluster.

An application group includes the application itself (such as Oracle, Apache, etc.), the application's Internet Protocol (IP) alias, network interface card (NC), the mount points that the application uses, and any other resources necessary for the application (a Listener, etc.).

Application groups may also be represented as objects. Application group objects may include the following attributes:

AppState: vector string, application related information. The AppState attribute shows the running status of different yet related application groups at multiple sites. A sample value of this attribute is provided below:

site : cluster : group : [ONLINE | OFFLINE | FAULTED | . . . ]

RepState: association string, replication related information. The state of the replication. Sample values include RUNNING, PAUSE, AUTO_SYNC, and DETACHED. The RepState value is returned by the framework's "monitor" entry point for a replication agent, as described above.

RepStat: association string, replication related information. The RepStat variable describes the latency between the primary and the secondary replication groups; i.e., the number of outstanding writes, the number of invalid track numbers, and so on. The RepStat value is returned by the framework's "RepStat" entry point for a replication agent, as previously described.

A replication group may include a replication storage group (RSG) resource, one RVolume resource for each volume in the RSG, the diskgroup containing the RSG, an IP alias for the replication facility if present (so that replication can fail over), and any physical disks to be monitored by the cluster management application.

On the cluster where the replication facility is the primary node, both the application group and the replication group are running. On the secondary cluster, only the replication group is running. Since an RSG resource must be online on the secondary for replication to be active, the application must not be running since secondary volumes are read-only.

The application group can have an online local firm dependency to the replication group, meaning that it cannot go online unless the replication group is online.

The replication group should be auto-started everywhere, so that if the node reboots, the replication group can be started there, if necessary, automatically.

Examples of cluster configurations are shown below:
On cluster 1 (originally the primary node):
include "SRVMTypes.cf"
group app1
SystemList = { sys1a, sys1b }
)
Application app ( .. )
Mount mnt1 ( ... )
Mount mnt2 ( ... )
IP alias ( ...)
app requires mnt1
app requires mnt2
app requires alias
requires group rep1 online local firm
group rep1
SystemList = { sys1a, sys1b
AutoStartList = ( sys1a, sys1b)
RSG RSG
RSG = <vxvm RSG name>
SRL = <vxvm srl name>
RLinks = { <communication link name> )
Primary = true
DiskGroup = <vxvm dg name>
IP vvr alias
RVolume rvol1( ... )
RVolume rvol2( ... )
DiskGroup dg (StartVolumes = 0
StopVolumes = 0)

RSG requires vvrIalias
RSG requires rvol1
RSG requires rvol2
rvol1 requires dg
rvol2 requires dg Cluster 2 was originally the secondary node. When configured, the secondary cluster configuration appears as follows:

include "SRVMTypes.cf"
group app2
SystemList = { sys2a, sys2b
Application app ( .. )
Mount mnt1 ( ... )
Mount mnt2 ( ... )
IP alias ( ... )
// the address should be the same as that in cluster 1
// unless this cluster is on a different subnet, in
// which case DNS updating may be necessary through GCM
app requires mnt1
app requires mnt2
app requires alias
requires group rep2 online local firm
group rep2
SystemList = { sys2a, sys2b
AutoStartList = { sys2a, sys2b
RSG RSG
RSG = <vxvm RSG name>
SRL = <vxvm srl name>
RLinks = { <communication link name>
Primary = false
DiskGroup = <vxvm dg name>
)
IP vvr alias ( ... )
RVolume rvol1 ( ... )
RVolume rvol2 ( ... )
DiskGroup dg (StartVolumes = 0
StopVolumes = 0)
RSG requires vvr alias
RSG requires rvol1
RSG requires rvol2
rvol1 requires dg
rvol2 requires dg Relationship Configuration One component of the framework of the present invention is a management relationship called a "global application." In one embodiment of the invention, a management relationship referred to as a "global application" is used to manage groups that are linked for some common purpose. Examples of purposes for linking application groups are replication and failover. A replication relationship can be used to manage replication to guarantee that data are available at all sites in a distributed system and to coordinate with cluster management activities to move application groups from site to site based on resource availability or other requirements.

Figure 6:
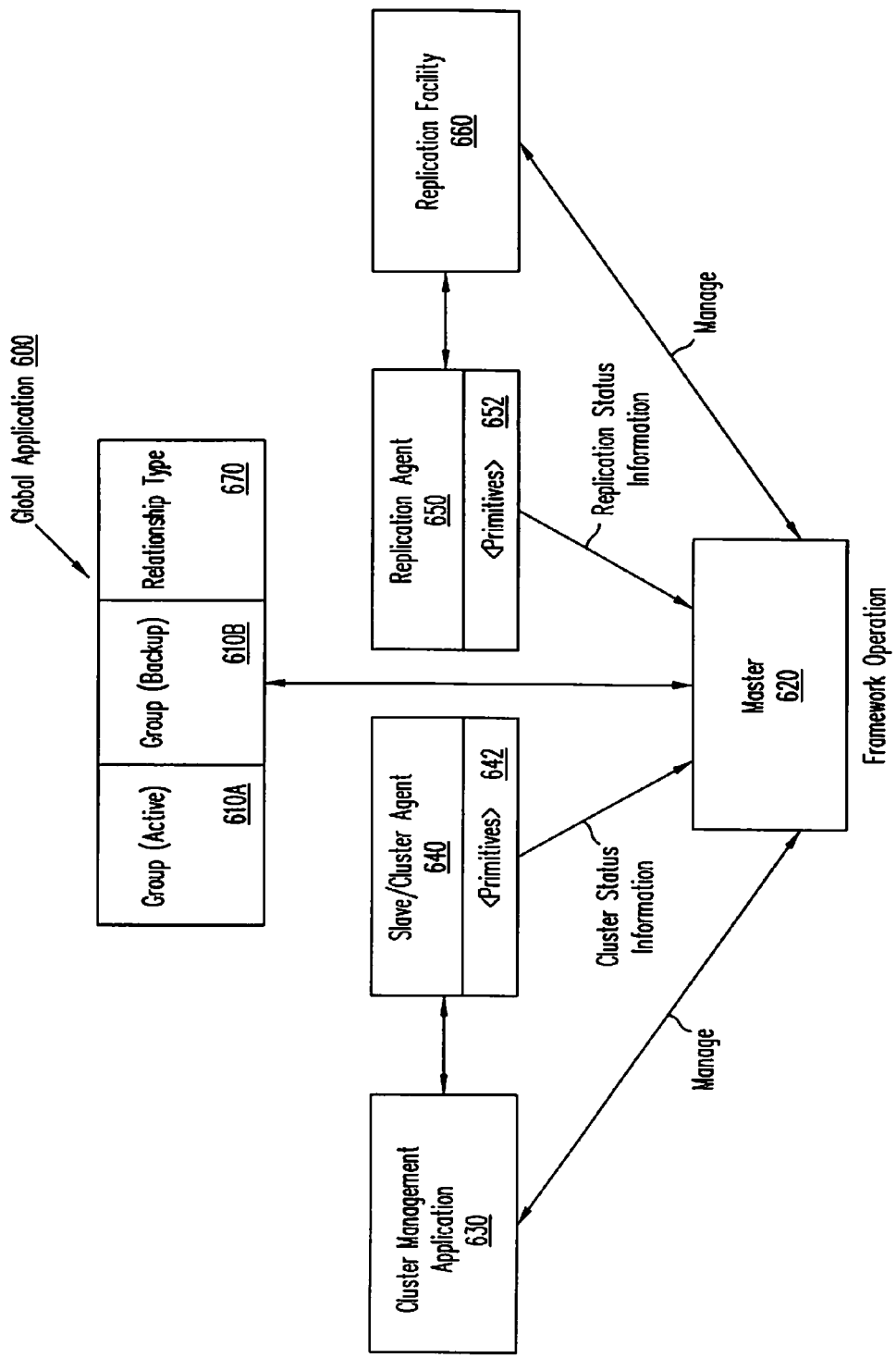
FIG. 6 shows an example of the modules involved in operation of the framework of the present invention.

FIG. 6 shows an example of the modules involved in operation of the framework of the present invention. A master 620 controls a cluster management application 630 and a replication facility 660 using cluster status information provided by a slave/cluster agent 640 and replication status information provided by a replication agent 650. Slave/cluster agent 640 communicates with master 620 using clustering agent primitives 642, and replication agent 650 communicates with master 620 using replication agent primitives 652.

A global application 600 corresponds to a structure specifying a relationship between application groups and includes a first group 610A (which serves as an active group), a second group 610B (which serves as a backup group), and a relationship type 670. Other embodiments of a global application may include more than two application groups and multiple attributes to describe general information, application-related information, replication-related information and network-related information. In an object-oriented embodiment of the invention, global application 600 corresponds to a global application object.

If replication is specified for attribute relationship type 670, replication agent 650 can be started to collect status and statistics of the replication process. The framework library (not shown) provides the getinfo and action entry points for the replication agent, as well as the parameters needed for the entry points.

In an object-oriented embodiment of the invention, a global application object is at a higher level than an application group object and specifies a relationship between two or more application groups. Typically global application 600 holds information for application groups that span across clusters and/or sites. For example, referring to FIG. 2, an Oracle application group configured at cluster 220C at site NY 230C may have a fail-over relationship with another Oracle application group configured at cluster 220E at site UK 230E. Global application 600 relates these two application groups.

Global application 600 should be capable of performing tasks such as the following:

1. Collecting application information, such as a System List of all nodes and a State of all the application groups included as part of the global application;

2. Collecting replication information, such as replication facility vendor, replication configuration, and replication status; and 3. Constructing events for across-cluster fail over. These events typically include pager or email notification of an administrator upon a disaster or intended take over, Domain Name Service (DNS) update for WAN fail over or take over, application stop and restart at a remote site, and migration of data replication to the remote site.

In one embodiment, global application 600 corresponds to a structure storing relationship information and accessible by the master. A command line interface is provided to modify the attributes of global application 600. Replication agents, such as replication agent 650, also update attributes of global application 600 showing replication status. Examples of attributes that may be included in global application 600 include the following:

Name: scalar string, general information. This field describes the name of the global application object.

Type: scalar string, general information. The relationship type of the application groups within this object. For example, the value of the Type attribute can be one of the following: [ Failover_On_Disaster | Follow_the_Sun_Migration | Replication]. "Follow the SUN migration" corresponds to switching to a different active node according to the time zone in which the site resides, so that the active node is active during normal working hours.

Comment: scalar string, general information. The Comment field is an informational field reserved for the creator of the global application object. Typical input for this attribute includes the name of the creator of this object, the purpose of the global application object, the time stamp when this global application object was created, and so on.

Owners: vector string, general information. The Owners field describes the owners of the global application, and a typical value of this attribute is person : phone : email : pager.

AppConfig: vector string, application related information. The AppConfig field describes the application groups that are highly available across WAN. A sample value of this attribute is given below:
  site : cluster : group
  remote_site : cluster : same_group The first value entry is the default for the primary site.

RepVendorInfo: scalar string, replication related information. The RepVendorInfo attribute shows the replication software vendor, software release level and version number, and so on. Example values for this field are given below:
  [ VERITAS Volume Replicator 3.1 for Solaris | EMC SRDF | Hitachi | Sybase ]

RepConfig : vector string, replication related information. The RepConfig field describes the replication configuration. The first entry describes the default for the primary site. A example of a value of this attribute is given below:
  host : dg : rvg (in VVR case)
  host : device_group : rdf (in EMC case)

An example of global application 600 is given below:
  Name = GlobalAppSample
  Type = Failover_On_Disaster
  Comment = created on Sep. 7, 2000 by John Doe, managing Oracle applications in UK and New York
  Owners = John Doe: 650-123-4567: john.doe@veritas.com
  AppConfig = {newyork : clus : group_oracle;
     uk : clus : group_oracle }
  AppState = { newyork : clus : group_oracle : ONLINE;
     uk : clus : group_oralce : OFFLINE }
  RepVendorInfo = VVR 3.1 for Solaris
  RepConfig = {thor28 : oracle_dg : oracle_rvg;
     thor25 : oracle_dg: oracle_rvg }
  RepState = {thor28 : oracle_dg : oracle_rvg: RUNNING;
     thor25 : oracle_dg : oracle_rvg : RUNNING}
  RepStat = 0 (note: no latency, secondary up-to-date)

In one embodiment, global application 600 is saved in a configuration file (not shown) in a section having a token called "globalapp." The contents of the global application object are saved using the following commands:
  globalapp add <name
  globalapp modify <name <attr <value . . .

In one embodiment, loading global application 600 from the configuration file and writing the global application object to the configuration file are handled by master 620.

In an embodiment, replication configuration information resides in the global application 600. When the replication configuration changes, replication agents such as replication agent 650 should be restarted.

In an embodiment of the framework, a master process, such as master 620, asks a slave process, such as slave/cluster agent 640, to start replication agent 650 with the information stored in global application 600. If slave 640 and the replication group run on different nodes, an administrator may need to use a command line interface for slave 640 to start the replication agent 650 remotely.

Replication agent 650 constantly updates master 620 with replication-related information, which is stored in application group object attributes RepState and RepStat, described above.

In one embodiment, a command line interface is provided for adding, deleting and modifying the attributes for the global application. Example commands include the following:
  gagap -add <name
  gagap -delete <name
  gagap -modify <name <attr <value . . .
  gagap -modify <name <attr -delete -keys
  gagap -display [<name]
  gagap -list
  gagap -help Replication Agent Setup A replication agent, such as replication agent 650, is an additional software module that provides information to an administrator and a conduit for issuing replication-related actions to the appropriate location. Replication agent 650 does not replace the onlining, offlining, and monitoring functionality of cluster management application 630.

Replication agent 650 runs in the same application group as the replication resources to obtain real-time, local statistics for replication. In an implementation where paired replication-related groups run simultaneously in two different clusters (the primary and the secondary clusters), a management console such as management console 104 of FIG. 1 may provide information about both replication groups.

A replication agent, such as replication agent 650, contains entry points for implementing the various responsibilities of the agent. Entry points for a replication agent within the framework of the present invention are described below:

Getinfo Entry Point

Given the name of the replication storage group (RSG), communication link and Diskgroup, determine the following:
  Current replication role (primary or secondary)
  Name of RSG and communication link(s)
  If primary, number of writes behind for each communication link
  primary, network statistics
  If secondary, whether consistent and attached Action Entry Point The action entry point supports several types of actions, which can be individually called by specifying the appropriate token to the gagrp-RepAction entry point. These actions provide the basic blocks for higher-level actions that span clusters, such as migrating applications from one site to another, including switching the role of replication. A wrapper can be created to automate various activities related to data replication in a single command.

In one embodiment, given the name of the local system, the name of a resource of type RSG, the name of the RSG, DiskGroup, storage replication log, and communication link, the replication agent accepts the following action tokens:
  check_consistent
  demote
  promote
  takeover
  convert
  resync-begin The check_consistent action is run on the replication secondary node to determine whether the current secondary node is consistent with the primary node. If the secondary node is inconsistent, (the action returns a non-zero error code), the roles of primary and secondary nodes should not be reversed.

The demote action is to be performed on the primary node. The demote action performs a sequence of commands to demote the primary node and makes it a valid secondary node. At the successful completion of the demote action, the primary attribute for the node is set to false, a primary attribute for the RSG resource is also set to false, and the communication link is attached, waiting for a newly-promoted primary node to connect. Because the demote action command involves stopping the RSG, the RSG resource is taken offline. The demote action will fail to demote a primary node if any of the following occur:

Write commands are outstanding.
  Service groups (such as application groups and replication groups) exist and are online that depend on the group containing the RSG resource.
  Failure to detach the communication link, disassociate a storage replication log from the primary, assign the proper attributes, re-associate the storage replication log with the new primary, or reattach the communication link.

Note that the action will exit immediately after the step that failed.

The promote action is to be performed on the secondary node, which is to be the new primary node. The promote action converts the secondary node into a primary, and starts replication from the new primary to the former primary, which has been demoted to a secondary node. At successful completion of the promote action, attributes are set identifying the RSG as the Primary, and the communication link is attached forcefully so it attempts to connect with the newly-demoted secondary node. The promote action fails to promote a secondary node if any of the following occur:
  A service group exists and is online that depends on the service group containing the RSG resource.
  Failure to detach the communication link, disassociate the storage replication log, assign the proper attributes, re-associate the storage replication log, or reattach the communication link.

The promote action will exit immediately after the step that failed.

The takeover action converts a secondary node into a primary node. The takeover action assumes that the primary node is completely down, and takes over the operation of the primary node at the former secondary node. Upon successful completion, attributes are set appropriately to reflect the new roles of the nodes, and the communication link is disassociated so that writes to storage occur in-pass through nodes. Once the failed primary node returns to service, the failed primary node is converted to a secondary node and resynchronized using a combination of actions described below. A takeover action will not be successful if any of the following occur:
  The RSG to be promoted is not consistent.
  A service groups that is online depends on the service group containing the RSG resource.
  Failure to detach the communication link, disassociate the storage replication log, assign the proper attributes, or re-associate the storage replication log.

The takeover action will exit immediately after the step that failed.

The convert action is initiated when a failed primary node returns to service and comes up in the state of a primary node. The convert action converts the former primary node to a secondary node. When the convert action is complete, the new secondary node should be re-synchronized with the existing primary node. The convert action performs similar steps to the demote action, except that the convert action will succeed even if there are outstanding writes, because those writes will be recovered through re-synchronization.

The resync-begin action starts automatic synchronization and exits. At the completion of the resync-begin action, the demoted secondary node has just begun to receive synchronized data. Therefore, the demoted secondary node is not ready to take over the responsibilities of a primary node. The time taken for the synchronization process to complete depends upon the amount of data to be synchronized. When synchronization is complete, the communication link appears as "up to date" at the former secondary node. The resync-begin action fails if the communication link on the new primary cannot be re-associated and re-attached.

In one embodiment of the invention, a command line interface is provided to perform replication actions. To run a replication action by itself, the command line interface includes a -repaction option for the gagrp command line, as shown below:
  # gagrp -repaction rep1 promote [ -clue cluster ] [ -site site ]

An example of a script implementation of the above command is shown below:
  # gaevent -add -action ev1 cond1 Group repaction rep1 promote [ -clue cluster ] [ -site site ]

Agent Framework

Figure 7:
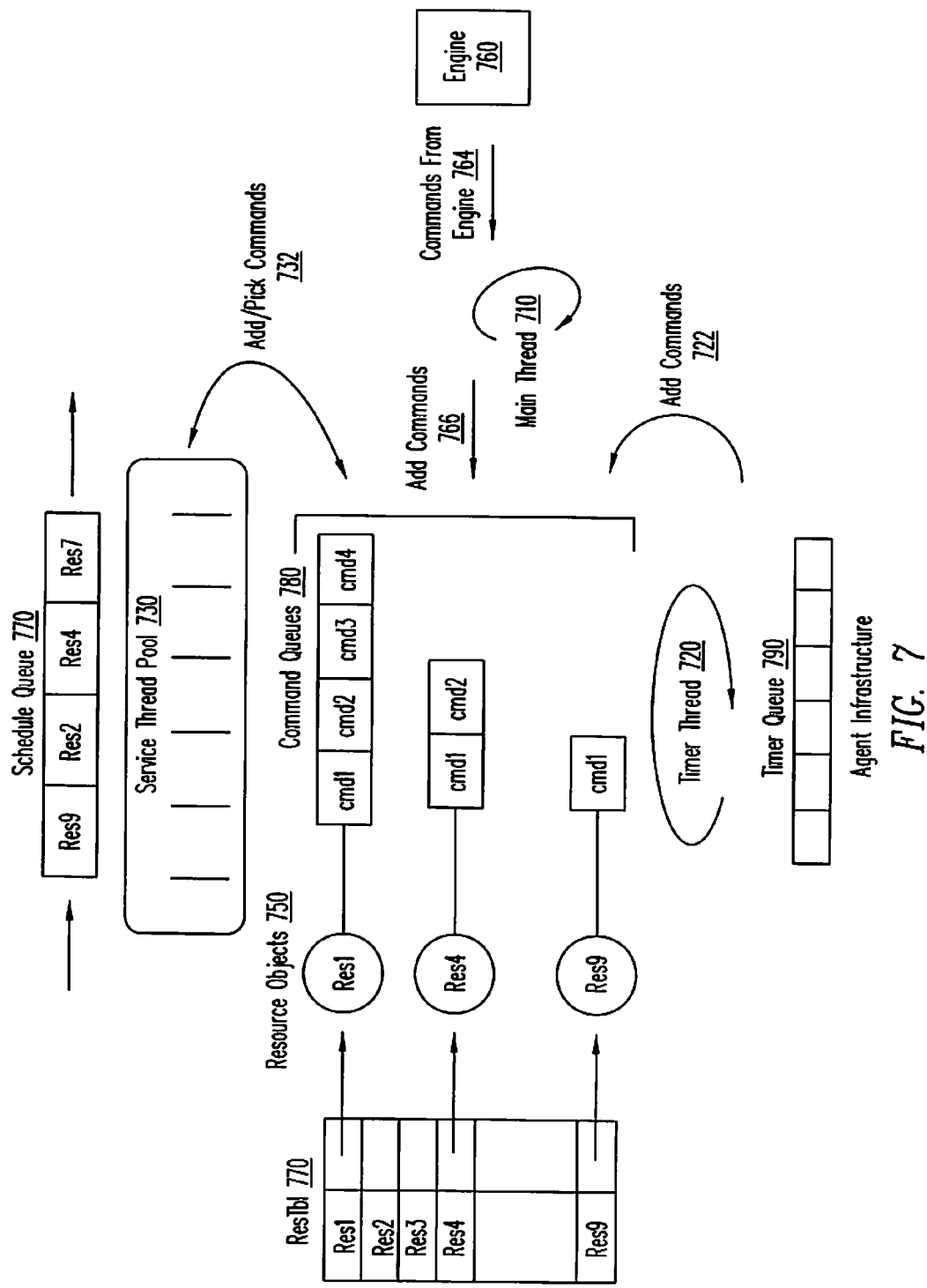
FIG. 7 shows an example of a framework for using agents in a cluster management application.

FIG. 7 shows an example of an infrastructure for using agents, including replication agents and clustering agents. Agents monitor resources such as systems and application groups providing services. When hardware or services fail, the components of the infrastructure restart the services on the same or a different computer system or node. The infrastructure includes primarily two classes of processes: engines, such as engine 760, and agents. An engine process performs the core cluster management functions, and an instance of the engine process runs on every node in the cluster. Each instance of the engine process is referred to herein as a cluster manager.

The engine (cluster manager) is responsible for servicing GUI requests and user commands, managing the cluster, and maintaining synchronization of the systems in a cluster. The task of managing individual resources is delegated to the agents. Agents perform the actual operations on the resources, such as resources Res1, Res2, Res3, and Res9 represented in RegTh1 740. Each agent manages resources of a particular type, such as disk resources on a computer system within a cluster. Multiple agent processes may run on a given computer system in a cluster, one agent for each resource type (i.e., one for disk resources, another for IP resources, and so on).

Each agent is configured to perform some common tasks, including the following:
  Upon starting up, downloading the resource configuration information from the cluster manager. Also, the agent registers with the cluster manager, so that the agent will receive notification when the resource configuration information changes.
  Periodically monitoring the resources and providing the status to the cluster manager.
  Changing a resource from online to offline or from offline to online when the cluster manager instructs the agent to do so.
  Canceling the online/offline/monitor operation when the operation exceeds an expected time for completion.
  Restarting a resource when the resource fails.
  Sending a log message to the cluster manager when any error is detected.

The agent infrastructure takes care of all such common tasks and greatly simplifies agent development. The design of the agent infrastructure provides the following capabilities:
  Parallelism—The agent infrastructure is multi-threaded. The same agent process can perform operations on multiple resources simultaneously.
  Serialized Operations on Resources—The agent infrastructure guarantees that at most one operation will be performed on a resource at any given time. For example, when a resource is being placed online, no other operations (for example, placing the resource offline or monitoring the resource) are performed on that resource.

Scalability—An agent can support several hundred resources.

Implementation Flexibility—Agents can be implemented using a variety of programming languages.

Configurability—Agents are developed for varied resource types. The agent infrastructure is configurable to suit the needs of different resource types.

Recovery—Agents can detect a hung/failed service and restart the service on the local node, without any intervention from the user or the cluster manager.

Faulty Resource Isolation—A faulty or misbehaving resource will not prevent the agent from effectively managing other resources.

Referring to FIG. 7, the agent infrastructure is multi-threaded and includes main thread 710, timer thread 720, and a configurable number of service threads included in service thread pool 730. Resources are represented as resource objects 750, and resources Res1, Res4 and Res9 have corresponding resource objects in FIG. 7. Each resource object has a corresponding entry in a resource table, represented as ResTh1 740. The ResTh1 740 entry points to the resource object.

Main thread 710 initializes the agent infrastructure by downloading resource configuration information from engine 760 and starting timer thread 720 and service threads within service thread pool 730. Main thread 710 waits for commands from engine 760. If a command is received for an existing resource, main thread 710 adds the command to one of the Command Queues 780 corresponding to the resource. Otherwise, main thread 710 processes the command itself.

Timer queue 790 consists of timer entries indicating when to initiate the periodic monitoring of a resource, when an operation should be timed out, and so on. Timer thread 720 wakes up every second and scans timer queue 790, and timer thread 720 initiates processing for any expired entries from timer queue 790.

Service threads do the actual processing of the resource commands (such as placing the resource online, taking the resource offline, monitor, modifying the value of an attribute, and so on). Each resource object also has a corresponding command queue of Command Queues 780. For example, the resource object for Res1 has four commands in the corresponding command queue, Res4 has two commands, and Res9 has one command.

Schedule queue 770 is a list of resources that have pending commands that are not currently being processed. Each service thread from service thread pool 730 obtains a resource from schedule queue 770 and processes the command from the head of the command queue of Command Queues 780 that corresponds to the resource.

Command Queues 780 are populated in three ways:

Main thread 710 queues resource commands received from engine 760, as shown by actions Commands from Engine 764 and Add Commands 766.

If timer thread 720 finds an expired timer for a resource, timer thread 720 adds the appropriate command (for example, MONITOR TIMEDOUT) to the command queue of Command Queues 780 that corresponds to the resource, as shown by action Add Commands 722.

When a service thread from service thread pool 730 is processing a command for a resource, the service thread may add a command to the command queue for the same or any other resource. This is illustrated by action Add/Pick Commands 732.

A command is removed from a command queue for a resource when a service thread processes the command.

Engine 760 uses names to identify resources when sending commands to the agent. In the embodiment illustrated in FIG. 7, the agent infrastructure internally uses a hash table (ResTb1 740) to map from the name of a resource, such as Res1, to a pointer to the corresponding resource object Res1 of resource objects 750.

Class Diagram

Figure 8:
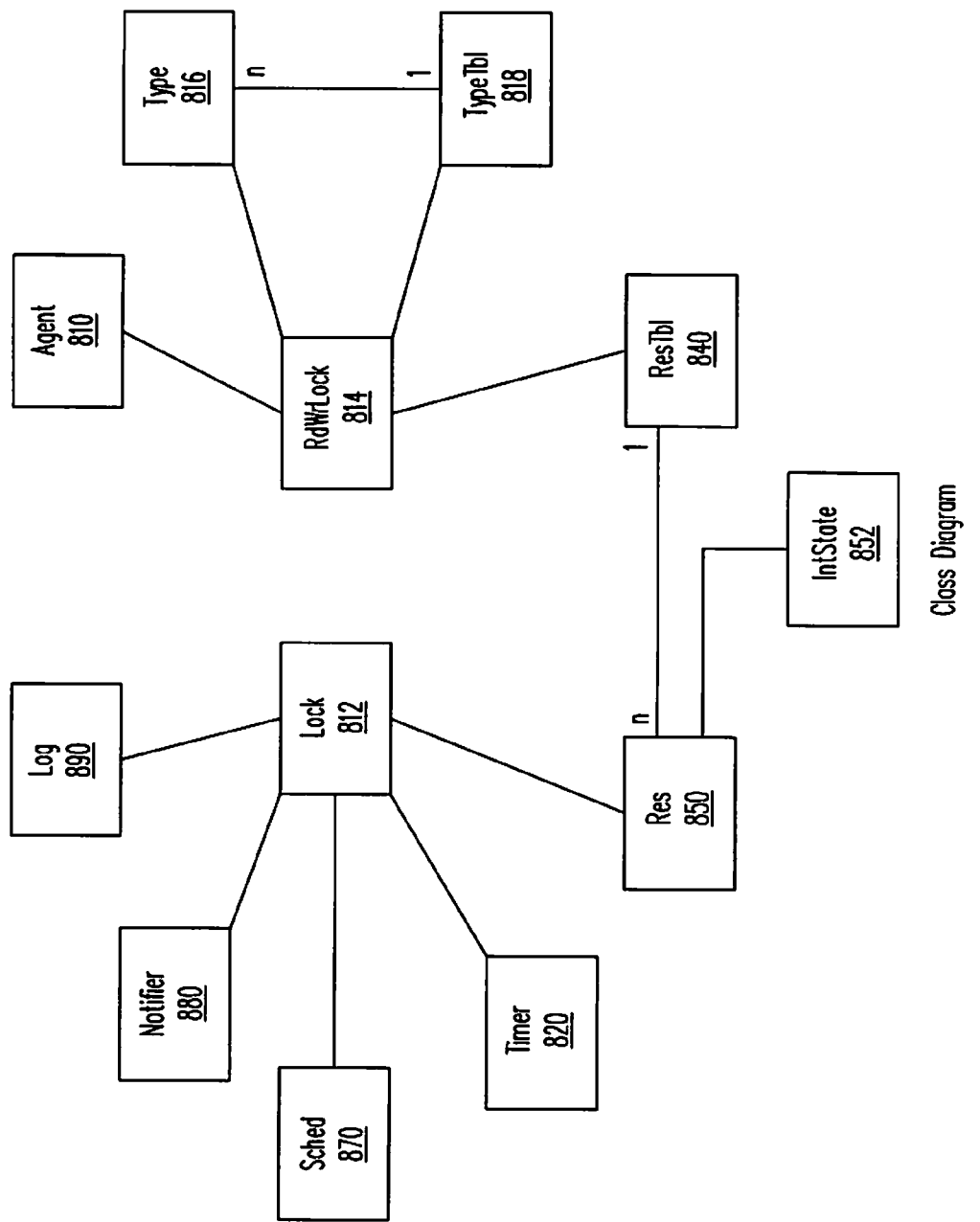
FIG. 8 shows a class diagram for using agents to manage resources.

FIG. 8 shows a class diagram for using agents to manage resources.

Agent class 810 is a singleton class representing a replication agent. Agent class 810 supports general purpose functions that are used throughout the agent infrastructure. Details including methods for the class are shown below:

| Agent(Singleton) |
| --- |
| name/id : string<br>initing : boolean<br>build ipm msg( )<br>exec_file exists( )<br>exec_script( )<br>Get id( ) |

Method name/id provides the name of the agent and is same as the resource type name (for example, Oracle, Disk, and so on.)

Method initing is a flag indicating if the agent process is initializing. Some commands are processed differently when an agent is initializing from when the agent is in a steady state.

Intstate class 852 is an abstract base class representing the internal state of a resource.

The methods of IntState class shown below correspond to the various events/commands that may be received by a resource from a cluster management application.

| IntState(Abstract) |
| --- |
| --none--<br>attr_changed( )<br>conf reached( )<br>delete attr( )<br>delete res( )<br>done waiting( )<br>modify_attr( )<br>monitor( )<br>myname( ) {abstract}<br>offline( )<br>online( )<br>probe( )<br>start( )<br>stop( )<br>timedout( ) |

The methods are described below:

The attr_changed( ) method indicates that attribute of another resource, on which this resource depends, has changed. The new value of the attribute is passed as argument. The attr_changed( ) method is used when an argument list for the resource specifies attribute dependency within the agent.

The conf_reached( )method indicates that the resource has reached the confidence interval indicating that the resource has stayed ONLINE without any faults for the period specified by the Confidence Interval attribute of the Type.

The delete attr( ) method is a request to delete an attribute of the resource.

The delete res( ) method is a request to delete the resource.

The done waiting( ) method indicates that the online/offline operation on the resource is complete, including waiting time, if any, returned by the online/offline method. This method is used when the resource is in a state of going online or going offline.

The modify_attr( ) method indicates that an attribute of the resource has changed.

The monitor( ) method is a request to monitor the resource.

The myname( ) method is an abstract function to obtain the name of the internal state of the resource.

The offline( ) method is a request to take the resource offline.

The online( ) method is a request to place the resource online.

The probe( ) method reports the resource status to the engine, irrespective of whether there is change in the resource status.

The start( ) method is a request to start managing the resource. The start( ) method causes the open( ) entry point to be invoked. Online/Offline/Monitor operations are accepted only for managed resources. The start method is triggered when an Enabled attribute of the resource is changed from 0 to 1.

The stop( ) method is a request to stop managing the resource. The stop( ) method causes the close( ) entry point to be invoked. Online/Offline/Monitor commands will not be accepted for the resource until the start( ) method has been invoked again for the resource. The stop( ) method is triggered when the Enabled attribute of the resource is changed from 1 to 0.

The timedout( ) method indicates that an operation on the resource timed out.

All the classes representing the internal state of a resource inherit from IntState and implement myname( ) and a subset of the other methods. The default implementation given by IntState for all the methods (except myname( ), which is abstract and hence has no default implementation) is to log an error message and discard the command.

The possible internal states (subclasses of the IntState class) of a resource are described below:

Cleaning—the resource is running the clean entry point.
Closing—the resource is running the close entry point.
Detached—the resource is not managed by the cluster management application.
GoingOffline—the resource is either running the offline entry point or is waiting for the time specified by the offline return value.
GoingOfflineWaiting—the resource is expecting to transition to Offline state and is awaiting the periodic monitor request.
GoingOnline—the resource is either running the online entry point or is waiting for the time specified by the online return value.
GoingOnlineWaiting—the resource is expecting to transition to Online state and is awaiting the periodic monitor request.
Monitoring—the resource is running the monitor entry point.
Offline—the resource is OFFLINE.
Online—the resource is ONLINE.
Opening—the resource is running the open entry point.

Lock class 812 is an abstraction of a "one-at-a-time" lock and can be implemented using pthread_mutex. An instance of lock class 812 internally stores the id of the thread that currently owns the lock, which helps a thread entering a critical section to verify that the thread does own the lock.

| Lock |
|---|
| mutex : pthread_mutex t<br>owner : pthread t<br>Acquire( )<br>assert caller is owner( )<br>release( )<br>try_acquire( ) |

Log class 890 is a singleton class that provides logging facility for the agent. Access to log class 890 is serialized through a lock. The value of the log-level data member determines which methods are logged. Possible values for the log-level include the following: all, debug, info, error and none, in order of decreasing verbosity.

| Log(Singleton) |
|---|
| log level : Enumerated<br>lock: Lock<br>log : Log * (class from lib/primitives)<br>debug( )<br>error( )<br>info( )<br>log( )<br>log-level( )<br>notify( )<br>safe log( )<br>trace( ) |

Methods debug( ), error( ), info( ) and trace( ) first check the log-level and accordingly either call the log( ) method, or simply return. For example, when the value of log-level is info, only return values for methods inf( ) and error( ) are logged, and return values for methods trace( ) and debug( ) are not logged.

The save_log( ) method ensures that the lock is released properly, even when the thread is cancelled in the middle of logging. The safe_log method is used instead of the log( ) method whenever the calling thread may be cancelled. To do the actual logging, log( ) and safelog( ) internally use the Log class from lib/primitives. The notify( ) method unconditionally logs the message and also sends the message to the engine to be placed in a cluster-wide log.

Notifier class 880 is a singleton class that handles communication such as sending messages to the engine and receiving messages from the engine. Access to Notifier class 880 is serialized through a lock.

| Notifier(Singleton) |
|---|
| engine-handle: Handle<br>Listener : Server<br>Listener-port int<br>lock : Lock<br>get cmd( )<br>safe_send( )<br>send( )<br>II<br>start listening( )<br>stop listening( ) |

The engine-handle is the client-side handle of a communication connection to the engine. An example of a communication connection to the engine is a TCP/IP socket connection. An instance of Notifier class 880 (and hence the agent)

sends and receives commands to and from the engine on communication connection. The corresponding methods are send( ) and get cmd( ), respectively. Safe_send( ) is similar to send( ), except that the safe_send( ) method frees the lock if the calling thread is cancelled in the middle of the send operation. The safe_send method is used instead of send( ) whenever it is possible that the calling thread may be cancelled An instance of Notifier class 880 (and hence the agent) can be instructed to listen and accept commands from a debug port (specified by the DebugPort static attribute of the Type) as well.

RdWrLock class 814 is shown below.

| RdWrLock |
| --- |
| mutex: pthread mutex t<br>rwlock : Hit<br>ok to read : pthread_cond t<br>ok to_write : pthread cond t<br>writer : pthread t<br>acquire read( )<br>acquire_write( )<br>assert caller is writer( )<br>release( )<br>try_read( ) |

RdWrLock class 814 is an abstraction of a "Multiple Read Single Write" lock and is implemented using pthread mutex and pthread condition variables. The lock also stores the thread id of the writer, assisting a thread entering a critical section to ensure that the owns the write lock, if appropriate. The value of rwlock indicates the status of the RdWrLock, having a value of 0 if there are no readers or writer, a value of −1 if there is a writer, and a value of n (>0) if there are n readers. The acquire_read( ) method and the acquire_write( ) method block until the requested lock is acquired. The try_read( ) method returns without blocking, irrespective of whether the lock is acquired. The return value of the try_read( ) method indicates whether a read lock was acquired or not. Writers have priority over readers in obtaining a lock.

Res class 850 is an abstract representation of a resource. Access to each Res object is controlled by a lock.

| Res |
| --- |
| attr_val : NVList<br>busy : boolean<br>III cmdq : VList<br>estate : Enumerated<br>listate : IntState<br>lock : Lock<br>type name : string<br>append_cmd( )<br>compute args( )<br>delete attr( )<br>get cmd( )<br>insert_cmd( )<br>lock( )<br>modifyattro )<br>process cmd( )<br>release( )<br>try lock( ) |

The state of a resource is captured by the following data members:

The attr val data member provides a list of the resource attributes and their values.

The busy data member is a flag indicating whether the resource is currently executing a request. A resource processes only one request at a time to avoid situations such as trying to online and offline a resource at the same time.

cmdq—list of pending commands for the resource.

ResTh1 class 840, describing the resource table, is shown below:

| ResTbl(Singleton) |
| --- |
| add( )<br>dump( )<br>find( )<br>read lock( )<br>release( )<br>remove( )<br>try_read lock( )<br>write lock( ) |

The add( ) and remove( ) methods require the caller to first acquire the write lock on the resource table. The find( ) method requires only a read lock, although a write lock may be used for the find( ) method. The dump( ) method writes the contents of the ResTh1 to the agent log file for debugging purposes.

Sched class 870 is a singleton class representing a resource scheduler that schedules resources on one of the service threads.

| Sched(Singleton) |
| --- |
| current : int<br>req_list : NVList<br>target : int<br>exit if surplus( )<br>get req( )<br>put req( )<br>target threads changed( ) |

The current and target data members indicate the existing and the desired number of service threads. If a request is received to increase the number of service threads (by changing the NumThreads attribute of the Type), an instance of Sched class 870 will create the required number of service threads. When the value of the target data member is less than the value of the current data member, service threads will terminate when they call the exit_if_surplus method. Preferably, all service threads call exit_if_surplus( ) after processing every resource command.

The req_list data member is a list of names of the resources that need processing, but are not already busy.

Resources are added to the schedule queue, such as Schedule Queue 770 of FIG. 7, (i.e., added to req_list), using the put_req( ) method. Service threads find a resource to process by calling the get req( ) method, which will block if req_list is empty.

Timer class 820 is a singleton class that provides time management services. The agent depends on timer class 820 to determine, for example, when to send a periodic I_Am_Alive message to the engine, when to initiate periodic monitoring of a resource, and when to decide that an operation has taken too long. Timer class 820 is shown in more detail below:

| Timer(Singleton) |
| --- |
| lock : Lock<br>timer list : NVList<br>add( )<br>cancel( )<br>cancel res timers( )<br>check timers( )<br>expire now( )<br>update_periodic_timers( ) |

An instance of timer class 820 internally keeps a list of timer entries. Access to an instance of timer class 820 is controlled by a lock.

Each timer entry contains the following information, among others:

operation type (Online, Timeout, Monitor command, etc.)

expiration time flag indicating whether the timer expiration is recurring (i.e., such as when the timer is a periodic timer)

if the timer is a periodic timer, the period.

the id of the thread associated with the operation.

The add( ) and cancel( ) methods respectively add and remove timer entries.

The expire_now( ) method causes a particular timer entry to expire now. Expiring a timer typically differs from canceling a timer because expiring a timer typically initiates an action.

The chck_timers( ) method initiates processing for all the expired timer entries. The timer thread, such as timer thread 720 of FIG. 7, wakes up every second and calls the chck_timers( ) method. The update_periodic_timers( ) method updates the period associated with the periodic timer entries. For example, when the MonitorInterval (Type attribute) is changed, all the corresponding periodic timer entries are updated Type class 816 represents resource types. Examples of type objects include Oracle, Disk, and IP.

| Type |
| --- |
| entry-points : EntryPointStruct<br>lock: RdWrLock<br>attr val : NVList<br>Type<br>call_attr_changed( )<br>call_clean( )<br>call-close( )<br>call_monitor( )<br>call offline<br>call online( )<br>call open( )<br>call shutdown( )<br>delete attr( )<br>get online timeout( ) . . .<br>modify_attr( )<br>read_lock( )<br>release( )<br>set entry_points( )<br>write lock( ) |

The pointers to C++ entry point implementations for the Type are stored in entry-points data member. Type class 816 supports a method for calling each entry points (such as online and offline entry points). These entry point methods call the implementation of the entry point. Access to each Type object is serialized through a RdWrLock.

TypeTbl class 818 is a singleton class that provides the type name to Type object mapping. Access to the TypeTbl is controlled by RdWrLock.

| TypeTbl(Singleton) |
| --- |
| lock: RdWrLock<br>tbl: HashTable<br>add( )<br>dump( )<br>find( )<br>read lock( )<br>release( )<br>remove( )<br>try_read_lock( ) |

State Diagram

Figure 9:
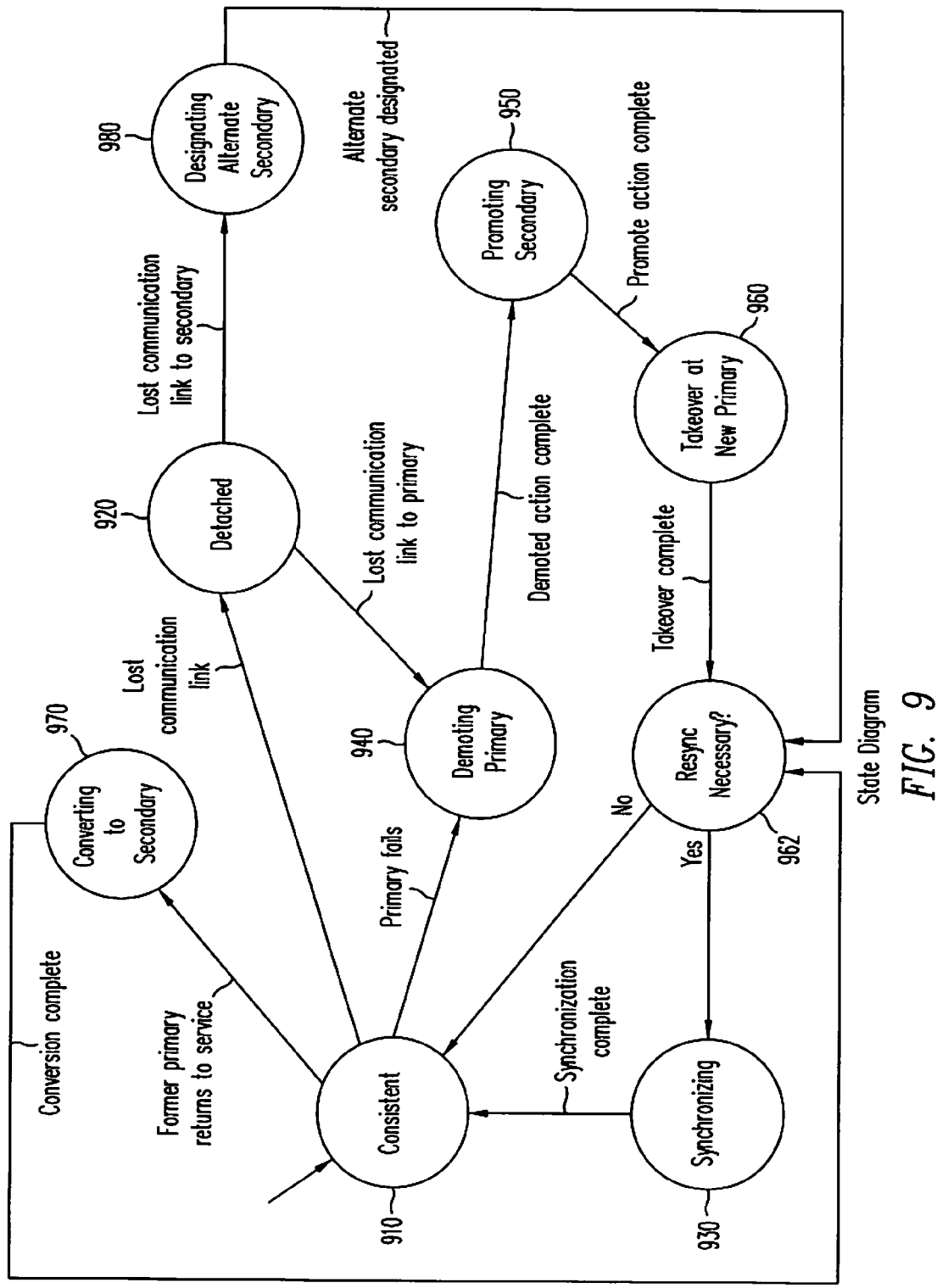
FIG. 9 is a state diagram for a replication group managed using the framework of the present invention.

FIG. 9 is a state diagram for a replication group managed using the framework of the present invention. An replication group resource initially enters Consistent state 910. If a communication link to the primary or secondary node of the replication group is lost, the replication group transitions to Detached state 920. Information about the detached state of the resources is gathered, and a determination is made whether the lost communication link was to the primary or secondary node. If the lost communication link was to the primary node, the replication group transitions to Demoting Primary state 940. The primary node is demoted and the status of the node is updated to indicate that the node is no longer a primary node.

When the demote action is complete at the primary node, the replication group transitions to Promoting Secondary Node state 950. The role of the newly-promoted primary node is updated to indicate that the node has assumed the role of primary node. When the promote action is complete, the newly-promoted primary node takes over the replication process in Takeover at New Primary state 960. The status of the replication group is updated to indicate that replication is now active from the new primary node to another secondary node. From Takeover at New Primary state 960, control transitions Resync Necessary state 962. If resynchronization is necessary, control transitions to Synchronizing state 930 to synchronize data between nodes. When the two nodes are synchronized, the replication group returns to Consistent state 910. If resynchronization is not necessary in Resync Necessary state 962, the replication group returns to Consistent state 910.

If in Detached state 920, a determination is made that the communication link to the secondary node was lost, control transitions to Designating Alternate Secondary node 980. If another secondary node exists for the primary node, that secondary node continues to operate as a secondary. If another secondary node does not exist, an administrator may need to establish an alternate management relationship, or global application, to ensure that the data are replication. When an alternate secondary is designated, control transitions to Resync Necessary state 962 to determine whether resynchronization is needed. If resynchronization is necessary, control transitions to Synchronizing state 930 to synchronize data between nodes. When the two nodes are synchronized, the replication group returns to Consistent state 910. If resynchronization is not necessary in Resync Necessary state 962, the replication group returns to Consistent state 910.

When the former primary node returns to service, the former primary node may have configuration variables that indicate it is acting in a primary role Control transitions to Converting to Secondary state 970. When the conversion is complete, control transitions to Resync Necessary state 962 to determine whether resynchronization is needed. If resynchronization is necessary, control transitions to Synchronizing state 930 to synchronize data between nodes. When the two nodes are synchronized, the replication group returns to Consistent state 910. If resynchronization is not necessary in Resync Necessary state 962, the replication group returns to Consistent state 910.

Message Protocol

This section describes the messages used within the framework of the present invention with reference to FIG. 6. These messages may be issued by an administrator using a graphical user interface or via a command line interface provided by a management console such as management console 104 of FIG. 1. In one embodiment, a graphical user interface provides a button and/or link with which the administrator can perform a series of clustering operations and/or replication operations with one click. Alternatively, these messages may be automatically generated by software modules or objects implementing the framework.

To establish a global application, or management relationship such as global application 600, between two groups, the following sequence of commands is used:

| gagap->master | | | | |
|---|---|---|---|---|
| MSG_GLOBALAPP_ADD | Name | | | |
| MSG_GLOBALAPP_MODIFY | Name | RepVendorInfo | Replic Facility | |
| MSG_GLOBALAPP_MODIFY | Name | AppConfig | Grp1 [:clus1] [:site1] | grp2 [:clus2] [:site2] ... |
| MSG_GLOBALAPP_MODIFY | Name | RepConfig | Type1 | Attr1 [,Attr2] |

The MSG_GLOBALAPP_ADD command adds a global application, such as global application 600, to the framework, which generates a replication agent, such as replication agent 650, for each cluster. A name for the new global application is a parameter for the message. Different messages may have different parameters, depending upon the implementation of the framework and the cluster management applications and replication facilities involved.

The first MSG_GLOBALAPP_MODIFY command adds a replication facility, such as replication facility 660, to the global application, such as global application 600. The Replication Facility parameter indicates the type of replication agent to be created. One replication agent, such as replication agent 650, is created for each different replication facility.

The second MSG_GLOBALAPP_MODIFY command adds an application group, such as the application group comprising group 610A and group 610B, to the global application, specifying an application configuration and group information. For example, an Oracle application group in New York may be related to an Oracle group in Japan, and the name of the group, cluster and site are provided to indicate the relationship.

The third MSG_GLOBALAPP_MODIFY command adds a replication group to the global application, specifying a replication configuration, Type information, and attribute information. The RepConfig parameter provides additional information regarding how to manage replication for the global application.

This sequence of commands establishes application groups and replication groups to enable coordination between the cluster management application and the replication facility.

The master process, such as master 620, upon receipt of modification of AppConfig attribute, sends a MSG_GLOBALAPP_CONFIGURE message to each slave process, such as slave/cluster agent 640, managing clustering for each application group in the application configuration:

| master->slave | | | |
|---|---|---|---|
| MSG_GLOBALAPP_CONFIGURE | Name | MasterIP | Group |

The master, such as master 620, provides the MasterIP parameter to provide the master IP address for opening a communication connection, such as a TCP/IP socket connection, to a replication agent, such as replication agent 650, to be added to each application group.

In response to the command from the master, each slave process, such as slave/cluster agent 640, performs the following commands:

| slave->cluster management application | | | |
|---|---|---|---|
| MSG_RES_ADD | ReplicationAgent | Process | Group |

If an error results, the slave process can choose another name or log an error.

The MSG_RES_ADD message adds the replication agent, such as replication agent 650, to the application group as a Process type resource. Upon completion of the MSG_RES_ADD command, a replication agent, such as replication agent 650, is running wherever an application group is running.

The next group of commands from the slave process, such as slave/cluster agent 640, to the cluster management application, such as cluster management application 630, configures the replication agent as a resource:

| slave->cluster management application | | | |
|---|---|---|---|
| MSG_RES_MODIFY | ReplicationAgent | PathName | /opt/VRTS/bin/ Replication/ ReplicationA |

Because the slave process knows its own site and cluster attributes, the slave process can add those to the arguments for adding the replication agent, as shown by the following command:

| slave->cluster management application | | |
|---|---|---|
| MSG_RES_LOCAL | ReplicationAgent | Arguments |

For each system in the SystemList, the slave process issues the following three commands.

| slave->cluster management application | | | |
|---|---|---|---|
| MSG_RES_MODIFY | ReplicationAgent | Arguments | Name |
| MSG_RES_MODIFY | ReplicationAgent | Critical | 0 |
| MSG_RES_MODIFY | ReplicationAgent | Enabled | 1 |

If the application group is online anywhere in the distributed system, the slave process localizes the arguments attribute to add the name of the system (node) for each system in the SystemList for the distributed system.

| slave->cluster management application | | |
|---|---|---|
| MSG_RES_ONLINE | ReplicationAgent | System |

Upon completion of the MSG_RES_ONLINE command, the replication agent, such as replication agent 650, has been added to each application group. The replication agent preferably runs on the same node as the application itself, such as the node on which cluster management application 630 is running, as the master process, such as master 620, may not be running at the same node as the replication process.

Once the replication agent, such as replication agent 650, starts, the replication agent registers with the master process, such as master 620, sending the global application name, application group, system, cluster, and site. An error check is performed to verify the global application name and application group name. This registration process begins a handshaking process to establish a communication connection between the master process and the replication agent.

| agent->master | | | | | |
|---|---|---|---|---|---|
| MSG_REGISTER_GLOBALAPP #SYSTEM\|CLUSTER\|SITE | Name | Group | System | cluster | Site |

The master process, such as master 620, stores the communication handle Handle for the replication agent, such as replication agent 650, in the instance of the Group object.

In response to the registration by the agent, the master process responds with a snapshot of the current replication status and cluster status information. Subsequent continuous updates for attributes of the specified global application are also provided by the master process to the agent.

| master->agent | | | |
|---|---|---|---|
| MSG_GLOBALAPP_ADD | Name | | |
| MSG_GLOBALAPP_MODIFY | ... | | |
| MSG_GLOBALAPP_MODIFY | Name | RepConfig | values ... |
| MSG_GLOBALAPP_MODIFY | Name | GetInfoInterval | value |
| MSG_GLOBALAPP_MODIFY | ... | | |

The framework also stores interval-related attributes. The agent sends a message to the cluster management application to parse the replication configuration.

| agent->cluster management application | |
|---|---|
| MSG_REGISTER_TYPERESOURCES | Type |

In response, the cluster management application returns a first value having the name of a Type and a second value with a comma-separated list of attributes.

| cluster management application->agent | | | |
|---|---|---|---|
| MSG_RES_MODIFY | Type | Attribute1 | Value ... |
| MSG_RES_MODIFY | Type | Attribute2 | value ... |
| MSG_RES_MODIFY_DELETE_KEYS | Type | Attribute2 | |

The master process can periodically send action commands, such as commands to perform an operation, to the replication agent:

| master->agent | | | |
|---|---|---|---|
| MSG_GLOBALAPP_ACTION #sequenceX | Name | Parameters | ... |

In response to the action command, the replication agent indicates success or error, along with information available regarding the action:

| agent->master |
|---|
| call action (char *sysname, void **action_parameters, void **arguments)<br>    if STRCMP (action_parameters[0], "demote")  (<br>        etc.<br>    )<br>    exit 0;<br>MSG_CMD_SUCCESS_NOINFO<br>#sequenceX<br>    exit 1;<br>MSG_CMD_ERROR_INFO    info ...<br>#sequenceX |

When a replication agent goes offline, the replication agent unregisters with the master process, notifying the master process that the replication agent is shutting down:

```
agent->master call shutdown (char *sysname, void **arguments)
MSG_UNREGISTER_GLOBALAPP name group System cluster site
```

The master process disconnects the communication connection with the replication agent and may notify an administrator via a management console that the replication agent is no longer running One of ordinary skill in the art will recognize that nodes included in the distributed system described herein, such as nodes 110A through 110D of FIG. 1, can be a server computer system and/or a computer system operably coupled to a server computer system. As mentioned above, storage devices, such as storage 140A of FIG. 1, may comprise a storage array managed by a storage server on a storage area network.

Figure 10:
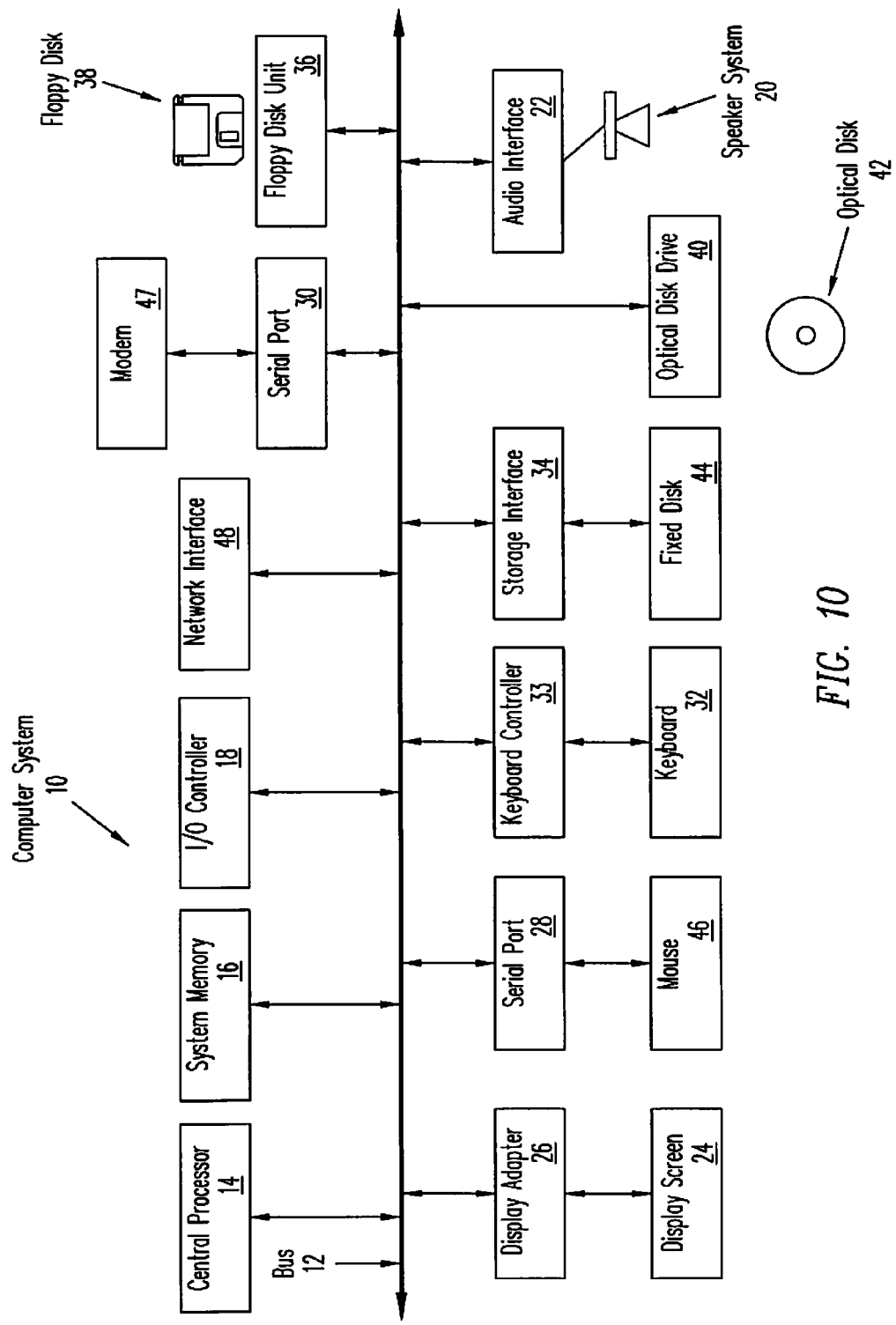
FIG. 10 is a block diagram illustrating a computer system suitable for implementing embodiments of the present invention.

FIG. 10 depicts a block diagram of a computer system 10 suitable for implementing the present invention. Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM o10 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 10 to be present to practice the present invention. The devices and subsystems may be interconnected in different ways from that shown in FIG. 10. The operation of a computer system such as that shown in FIG. 10 is readily known in the art and is not discussed in detail in this application. Code to implement the present invention may be stored in computer-readable storage media such as one or more of system memory 16, fixed disk 44, CD-ROM 42, or floppy disk 38. Additionally, computer system 10 maybe any kind of computing device, and so includes personal data assistants (PDAs), network appliances, X-window terminals or other such computing devices. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The present invention provides a framework for managing both clustering and data replication. The framework is designed to work with existing cluster management applications and data replication facilities. The framework coordinates actions to ensure that clustering and replication activities are synchronized and are not disruptive of each other.

The framework described herein may be used in conjunction with any type of replication facility and/or cluster management application. In particular, the framework can be used in conjunction with cluster management applications such as VERITAS Global Cluster Manager, Hewlett-Packard MC/Service Guard, and Microsoft Cluster Server; database management systems such as Oracle, Sybase, Informix, DB2, and SQL Server; backup products such as VERITAS Netbackup and IBM Tivoli; mail servers such as Microsoft Exchange; file systems such VERITAS file system (VxFS), UNIX file system (UFS), journal file systems (JFS and J2FS), extent file system (ext2FS), and Windows NT file system (NTFS); web servers such as Internet Information Server, Netscape Enterprise Server, WebLogic, iPlanet, and Apache;

other versioning products; or any other application replicating data and/or managing clusters.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments show different components contained within other components (i.e., replication agent 510A is shown as a component of replication group 520-R). It is to be understood that such depicted architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   obtaining cluster status information for a plurality of clusters comprising a plurality of nodes;
   obtaining replication status information for at least one of the plurality of nodes, wherein the replication status information comprises information identifying a current state and a current latency of asynchronous data replication for application data replication between the nodes, wherein application data is replicated in response to a write operation by an application to the application data; and
   managing an operation from a node different from the at least one of the plurality of nodes using the cluster status information and the replication status information in combination, wherein the operation corresponds to one of a clustering operation and a replication operation; and the managing is performed at least in part automatically.

2. The method of claim 1 further comprising:
   automatically providing the cluster status information and the replication status information for the managing.

3. The method of claim 1 wherein
   the managing the operation comprises causing the operation to be performed.

4. The method of claim 1 wherein
   the managing the operation comprises automatically identifying a second operation to be performed in conjunction with the operation, wherein the second operation corresponds to one of:
   a second clustering operation; and
   a second replication operation.

5. The method of claim 4 wherein
   the managing the operation comprises causing the operation and the second operation to be performed.

6. The method of claim 1 wherein
   the managing the operation comprises automatically determining when to perform the operation.

7. The method of claim 1 wherein
   the managing the operation comprises automatically determining a resource upon which to perform the operation.

8. The method of claim 1 wherein
   the managing the operation further comprises:
   using a relationship between a first application group and a second application group for determining a resource associated with the operation.

9. The method of claim 1 wherein
   the operation corresponds to a replication operation; and
   the managing the replication operation further comprises:

using a relationship between a first replication group and a second replication group for determining a primary node and a secondary node associated with the replication operation.

10. The method of claim 1 wherein
the operation corresponds to a clustering operation; and
the clustering operation comprises at least one of:
  bringing a first resource online;
  taking a second resource offline; and
  monitoring a third resource.

11. The method of claim 1 wherein
the operation comprises a replication action related to a primary node and a secondary node; and
the replication action corresponds to at least one of:
  checking consistency between primary data at the primary node and secondary data at the secondary node;
  demoting the primary node;
  promoting the secondary node;
  taking over an application at the primary node;
  converting the primary node to a second secondary node; and
  synchronizing the primary data and the secondary data.

12. The method of claim 1 wherein
the managing the operation is performed by a master.

13. The method of claim 12 wherein
the master is capable of managing both the clustering operation and the replication operation.

14. The method of claim 12 further compromising:
automatically providing the cluster status information and the replication status information to the master.

15. A method comprising:
obtaining cluster status information for a plurality of clusters comprising a plurality of nodes;
obtaining replication status information for at least one of the plurality of nodes, wherein the replication status information comprises information identifying a current state and a current latency of asynchronous data replication for application data replication between the nodes, wherein the application data replication comprises replicating application data in response to a write operation by an application to the application data;
automatically providing the cluster status information and the replication status information to a master operating on a node different from the at least one of the plurality of nodes; and
managing an operation using the cluster status information and the replication status information in combination, wherein the operation corresponds to one of a clustering operation and a replication operation; and
the managing is performed by the master.

16. A system comprising:
a node comprising a processor;
a first agent configured to obtain cluster status information from a cluster management application;
a second agent configured to obtain replication status information from a replication facility wherein the replication status information comprises information identifying a current state and a current latency of asynchronous data replication; and
a master, wherein the master is configured to manage an operation using the cluster status information and the replication status information in combination,
  at least one of the first agent and the second agent operates on the node, wherein the node is different from a node on which the master operates,
  the cluster management application is configured to perform a clustering operation for a plurality of nodes organized into a plurality of clusters,
  the replication facility is configured to perform a replication operation for replicating application data between the nodes, wherein the replication facility replicates application data in response to a write operation by an application to the application data, and
  the operation corresponds to one of the clustering operation and the replication operation.

17. The system of claim 16 wherein
the first agent and the second agent are the same.

18. The system of claim 16 further comprising:
a process configured to automatically provide the cluster status information and the replication status information to the master.

19. The system of claim 16 wherein
the master is configured to manage the operation by virtue of being further configured to cause the operation to be performed.

20. The system of claim 16 wherein
the master is configured to manage both the clustering operation and the replication operation.

21. The system of claim 16 wherein
the master is configured to manage the operation by virtue of being further configured to:
  automatically identify a second operation to be performed in conjunction with the operation, wherein the second operation corresponds to one of:
    a second clustering operation; and
    a second replication operation.

22. The system of claim 21 wherein
the master is configured to manage the operation by virtue of being further configured to cause the operation and the second operation to be performed.

23. The system of claim 16 wherein
the master is configured to manage the operation by virtue of being further configured to:
  automatically determine when to perform the operation.

24. The system of claim 16 wherein
the master is configured to manage the operation by virtue of being further configured to:
  automatically determine a resource upon which to perform the operation.

25. The system of claim 16 wherein
the master is configured to manage the operation by virtue of being further configured to:
  use a relationship between a first application group and a second application group to determine a resource associated with the operation.

26. The system of claim 16 wherein
the operation corresponds to a replication operation; and
the master is configured to manage the operation by virtue of being further configured to:
  use a relationship between a first replication group and a second replication group to determine a primary node and a secondary node associated with the replication operation.

27. An interface comprising:
a computer readable storage device for storing a library comprising a primitive;
at least one agent configured to implement at least one entry point to:
  obtain cluster status information from a cluster management application, obtain replication status information from a replication facility, wherein the replication status information comprises information identifying a current state and a current latency of asynchronous data replication, and call the primitive to communicate with a master, wherein the at least one agent operates on a node different from a node on which the master operates;

wherein the cluster management application is configured to perform a clustering operation for a plurality of nodes organized into a plurality of clusters, the replication facility is configured to perform a replication operation to replicate application data between the nodes, the replication facility is configured to replicate the application data in response to a write operation by an application to the application data, the master is configured to manage an operation using the cluster status information and the replication status information in combination, and the operation corresponds to one of the clustering operation and the replication operation.

28. The interface of claim 27 wherein
at least one agent is configured to automatically provide the cluster status information and the replication status information to the master.

29. The interface of claim 27 wherein
the operation corresponds to a clustering operation; and
the clustering operation comprises at least one of:
bringing a first resource online;
taking a second resource offline; and
monitoring a third resource.

30. The interface of claim 27 wherein
the operation comprises a replication action related to a primary node and a secondary node;
the replication action corresponds to at least one of:
checking consistency between primary data at the primary node and secondary data at the secondary node;
demoting the primary node;
promoting the secondary node;
taking over an application at the primary node;
converting the primary node to a second secondary node; and
synchronizing the primary data and the secondary data.

31. A system comprising:
a computer readable storage means for storing cluster status information;
first obtaining means for obtaining the cluster status information for a plurality of clusters including a plurality of nodes;
second obtaining means for obtaining replication status information for at least one of the plurality of nodes, wherein the replication status information comprises information identifying a current state and a current latency of asynchronous data replication for application data replication between the nodes, wherein the application data is replicated in response to a write operation by an application to the application data; and managing means for managing an operation from a node different from the at least one of the plurality of nodes using the cluster status information and the replication status information in combination, wherein the operation corresponds to one of a clustering operation and a replication operation.

32. The system of claim 31 wherein
the managing means further comprise causing means to cause the operation to be performed.

33. The system of claim 31 wherein
the managing means further comprise:
identifying means for identifying a second operation to be performed in conjunction with the operation, wherein the second operation corresponds to one of:
a second clustering operation; and
a second replication operation.

34. A computer program product comprising:
first obtaining instructions to obtain cluster status information for a plurality of clusters including a plurality of nodes;
second obtaining instructions to obtain replication status information for at least one of the plurality of nodes, wherein the replication status information comprises information identifying a current state and a current latency of asynchronous data replication for application data replication between the nodes wherein the application data is replicated in response to a write operation by an application to the application data;
managing instructions to manage an operation from a node different from the at least one of the plurality of nodes using the cluster status information and the replication status information in combination, wherein the operation corresponds to one of a clustering operation and a replication operation; and
a computer readable storage medium to store the first and second obtaining instructions and the managing instructions.

35. The computer program product of claim 34 wherein the managing instructions further comprise causing instructions to cause the operation to be performed.

36. The computer program product of claim 34 wherein the managing instructions further comprise:
identifying instructions to identify a second operation to be performed in conjunction with the operation, wherein the second operation corresponds to one of:
a second clustering operation; and
a second replication operation.

* * * * *